(12) United States Patent
Ishii et al.

(10) Patent No.: US 8,105,203 B2
(45) Date of Patent: Jan. 31, 2012

(54) DUAL CLUTCH TRANSMISSION

(75) Inventors: Norihiro Ishii, Amagasaki (JP); Kengo Sasahara, Amagasaki (JP); Kazunari Koga, Amagasaki (JP); Tomoyuki Ebihara, Amagasaki (JP)

(73) Assignee: Kanzaki Kokyakoki Mfg. Co., Ltd., Hyogo (JP)

( * ) Notice: Subject to any disclaimer, the term of this patent is extended or adjusted under 35 U.S.C. 154(b) by 840 days.

(21) Appl. No.: 12/191,032

(22) Filed: Aug. 13, 2008

(65) Prior Publication Data

US 2009/0045026 A1 Feb. 19, 2009

(30) Foreign Application Priority Data

Aug. 17, 2007 (JP) ................................. 2007-212996

(51) Int. Cl.
*F16H 61/26* (2006.01)
(52) U.S. Cl. .......................... 477/127; 477/130; 74/330
(58) Field of Classification Search .................. 74/330, 74/331, 335, 340; 477/127, 130
See application file for complete search history.

(56) References Cited

U.S. PATENT DOCUMENTS

| | | | | |
|---|---|---|---|---|
| 7,287,443 B2 * | 10/2007 | Kuhstrebe et al. | ............... | 74/335 |
| 2006/0037422 A1 * | 2/2006 | Kuhstrebe et al. | ............... | 74/340 |
| 2007/0028708 A1 * | 2/2007 | Futamura et al. | ............... | 74/335 |
| 2008/0214348 A1 * | 9/2008 | Hasegawa et al. | ............... | 475/80 |

FOREIGN PATENT DOCUMENTS

| | | |
|---|---|---|
| JP | 2000-233659 A | 8/2000 |
| JP | 2003-269592 | 9/2003 |
| JP | 2005-162051 A | 6/2005 |

OTHER PUBLICATIONS

Patent Abstracts of Japan, English language abstract for Publication No. JP 2003-269592, Twin Clutch Type Gear Transmission, published Sep. 25, 2003 (listed on accompanying PTO/SB/08A as document FP1).

"Notification of Refusal" in corresponding Japanese Patent Appln. No. 2007-212996, mailed Nov. 1, 2011, 4 pages (including English translation).

* cited by examiner

*Primary Examiner* — Ha D. Ho
(74) *Attorney, Agent, or Firm* — Sterne, Kessler, Goldstein & Fox PLLC

(57) ABSTRACT

A dual clutch transmission comprises a first clutch to be engaged for setting any one of forward-traveling odd-numbered speeds and a second clutch to be engaged for setting any one of forward-traveling even-numbered speeds. The dual clutch transmission establishes a desired forward-traveling speed by alternately engaging/disengaging the first and second clutches. A backward-traveling drive train is adapted to be driven by engaging one of the first and second clutches. When a reverse mode is established by a mode setting means, the one of the first and second clutches is engaged to drive the backward-traveling drive train by setting a speed change manipulator at a backward-traveling position, and the other of the first and second clutches is engaged to drive a fixed one forward-traveling speed drive train by setting the speed change manipulator at a forward-traveling position. While the reverse mode is established, the backward-traveling drive train and the fixed one forward-traveling speed drive train are kept activated regardless of whether the first or second clutch is engaged.

6 Claims, 21 Drawing Sheets

Fig. 11

| Speed | | Dual Clutch | | Shifter Position | | | |
|---|---|---|---|---|---|---|---|
| | | C 1 | C 2 | 97a | 98a | 99a | |
| For-ward | 1st | ON | OFF | A | B | N | — |
| | 2nd | OFF | ON | A | B | N | Shift Down |
| | | | | | N | D | Shift Up |
| | 3rd | ON | OFF | A | N | D | Shift Down |
| | | | | N | B | | Shift Up |
| | 4th | OFF | ON | N | B | D | — |
| Backward | | ON | OFF | N or A | C | N | — |

(a) Normal Traveling Mode

| Speed | Dual Clutch | | Shifter Position | | |
|---|---|---|---|---|---|
| | C 1 | C 2 | 97a | 98a | 99a |
| Forward 2nd | OFF | ON | A | C | N |
| Backward | ON | OFF | A | C | N |

(b) Reverse Mode

DUAL CLUTCH TRANSMISSION

BACKGROUND OF THE INVENTION

1. Field of the Invention

The present invention relates to a dual clutch transmission comprising a first clutch to be engaged for setting any one of a plurality of forward-traveling odd-numbered speeds and a second clutch to be engaged for setting any one of a plurality of forward-traveling even-numbered speeds, wherein a desired forward-traveling speed is caused by alternately engaging/disengaging the first and second clutches, and wherein a backward-traveling drive train is adapted to be activated by engaging one of the first and second clutches.

2. Related Art

As disclosed in JP 2003-269592, there is a well-known dual clutch transmission which receives power from a prime mover and is automatically gearshifted to change the speed of the output rotary power transmitted to an axle. The dual clutch transmission comprises a group of odd-numbered speed gear trains, a group of even-numbered speed gear trains, a first clutch, and a second clutch. When one of the odd-numbered speed gear trains is selected to be activated, the selected odd-numbered speed gear train is activated by engaging the first clutch, i.e., receives power from the prime mover through the engaged first clutch. When one of the even-numbered speed gear trains is selected to be activated, the selected even-numbered speed gear train is activated by engaging the second clutch, i.e., receives power from the prime mover through the engaged second clutch.

During the gearshift of the dual transmission between neighboring odd and even numbered speeds, the next speed gear train is selected while the current speed gear train still remains engaged, i.e., the current speed gear train and the next speed gear train are simultaneously selected to be driven, and then one of the first and second clutches having been engaged for activating the current speed gear train is disengaged while the other of the first and second clutches is engaged so as to activate the next speed gear train, i.e., the engagement and disengagement of the first and second clutches overlap, thereby ensuring gearshift without intermittence of power transmission.

However, when a working vehicle equipped with the dual clutch transmission is a utility vehicle equipped with a loader, and the vehicle frequently reverses its forward/backward traveling direction for removing snow by use of the loader, for example, the gearshift of the conventional dual clutch transmission for reversing the traveling direction is gradually performed by shifting down the forward traveling speed step by step to the neutral state before setting the backward traveling speed. This gearshift takes a long time which spoils the workability and requires this vehicle to travel a long distance.

SUMMARY OF THE INVENTION

An object of the invention is to provide a dual clutch transmission which can easily and swiftly switch the forward/backward traveling direction without reduction of working efficiency.

To achieve the object, a dual clutch transmission of the invention comprises: first and second clutches, a group of forward traveling odd numbered speed drive trains, a group of forward traveling even numbered speed drive trains, a backward traveling drive train, a traveling direction setting means, and a traveling mode setting means. The first and second clutches are alternately engaged and disengaged so that, during the shift of engagement between the first and second clutches, an engagement action of one of the first and second clutches overlaps a disengagement action of the other of the first and second clutches. When one of the forward traveling odd numbered speed drive trains is selected to be activated, the selected forward traveling odd numbered speed drive train is activated by engaging the first clutch. When one of the forward-traveling even-numbered speed drive trains is selected to be activated, the selected forward-traveling even-numbered speed drive train is activated by engaging the second clutch. When the backward traveling drive train is selected to be activated, the selected backward traveling drive train is activated by engaging one of the first and second clutches. The traveling direction setting means is provided for establishing either a forward traveling state or a backward traveling state. The traveling mode setting means is provided for establishing either a normal traveling mode or a reverse mode.

When the backward traveling state is established by the traveling direction setting means, regardless of whether the normal traveling mode or the reverse mode is established by the traveling mode setting means, the backward traveling drive train is selected to be activated by engaging one of the first and second clutches. When the normal traveling mode is established by the traveling mode setting means and the forward traveling state is established by the traveling direction setting means, any one drive train of all the forward traveling odd numbered and even numbered speed drive trains is selected to be activated so as to correspond to variation of an accelerator position (e.g., an operation degree of an accelerator operation device such as a depression degree of an accelerator pedal, an engine throttle opening degree, or a quantity of fuel injection), and an actual traveling speed of a vehicle (i.e., a vehicle speed). This drive train is activated by engaging the corresponding first or second clutch for activating the selected drive train. When the reverse mode is established by the traveling mode setting means and the forward traveling state is established by the traveling direction setting means, a predetermined forward-traveling drive train of all the forward traveling odd numbered and even numbered speed drive trains is selected to be activated regardless of variation of the accelerator position and the vehicle speed, and is activated by engaging the first or second clutch that is different from the clutch for activating the backward traveling drive train.

Therefore, for example, if a utility vehicle is equipped with a front loader and the dual clutch transmission configured as mentioned above, the reverse mode may be selected when the front loader is used for carrying earth and sand and requires frequent and repetitive switching of the forward/backward traveling direction of the vehicle. In this state, the vehicle travels backward by operating the traveling direction setting means for backward traveling of the vehicle. When the traveling direction setting means is operated to switch the backward-traveling state into the forward-traveling state, the vehicle swiftly starts forward because the operation of the traveling direction setting means in the reverse mode unambiguously activates the predetermined forward-traveling drive train instead of selecting one of all the forward-traveling drive trains to be activated in correspondence to the variation of the accelerator position and the vehicle speed. Accordingly, no time is wasted in selecting which forward-traveling speed drive train should be activated, thereby improving the workability.

Preferably, the dual clutch transmission is configured so that, while the reverse mode is established by the traveling mode setting means, both the predetermined forward-traveling drive train and the backward-traveling drive train are constantly selected to be activated regardless of whether the forward-traveling state or the backward-traveling state is established by the traveling direction setting means.

Therefore, if the selection of the drive train to be activated depends on the operation of shifters interposed between gears belonging to respective drive trains and a transmission shaft, neither the shifter for selecting activation of the predetermined forward-traveling drive train nor the shifter for selecting activation of the backward-traveling drive train are moved and only the shift of engagement between the first and second clutches is performed for the switching of the forward/backward traveling direction in the reverse mode, thereby further accelerating the switching of the traveling direction.

Preferably, the predetermined forward-traveling drive train is the lowest speed drive train of either the forward-traveling odd-numbered speed drive train group or the forward-traveling even-numbered speed drive train group, to which the predetermined forward-traveling drive train belongs. More specifically, when the clutch to be engaged for activating the backward-traveling drive train is the second clutch, the predetermined forward-traveling drive train is a forward-traveling first speed drive train which is activated by engaging the first clutch. Alternatively, when the clutch to be engaged for activating the backward-traveling drive train is the first clutch, the predetermined forward-traveling drive train is a forward-traveling second speed drive train to be activated by engaging the second clutch.

Therefore, in the reverse mode, the forward/backward traveling direction of the vehicle is performed at low speed so as to ensure safety and stability in the work.

Preferably, the dual clutch transmission further comprises a single manipulator, a first guide region and a second guide region. The single manipulator serves as both the traveling direction drive mode means and the traveling mode setting means. The first guide section is provided with a forward-traveling setting position and a backward-traveling setting position. The second guide section is provided with a forward-traveling setting position and a backward-traveling setting position. The normal traveling mode is established when the manipulator is disposed in the first guide region. The reverse mode is established when the manipulator is disposed in the second guide region. The forward-traveling state is established by locating the manipulator at the forward-traveling setting position of each of the first and second guide sections. The backward-traveling state is established by locating the manipulator at the backward-traveling setting position of each of the first and second guide regions.

In this way, the single manipulator is used for both the selection of either the normal traveling mode or the reverse mode, and the selection of either the forward traveling state or the backward traveling state, thereby reducing the number of components and costs. The operator does not have to move between one manipulator and another manipulator, thereby simplifying manipulation and preventing misoperation.

BRIEF DESCRIPTION OF THE DRAWINGS

FIG. 11(a) is a table indicating positions of shifters and states of first and second clutches in correspondence to every speed of the dual clutch transmission in a normal traveling mode.

FIG. 11(b) is a table indicating positions of shifters and states of first and second clutches in correspondence to every speed of the dual clutch transmission in a reverse mode.

DETAILED DESCRIPTION OF THE INVENTION

Figure 1:
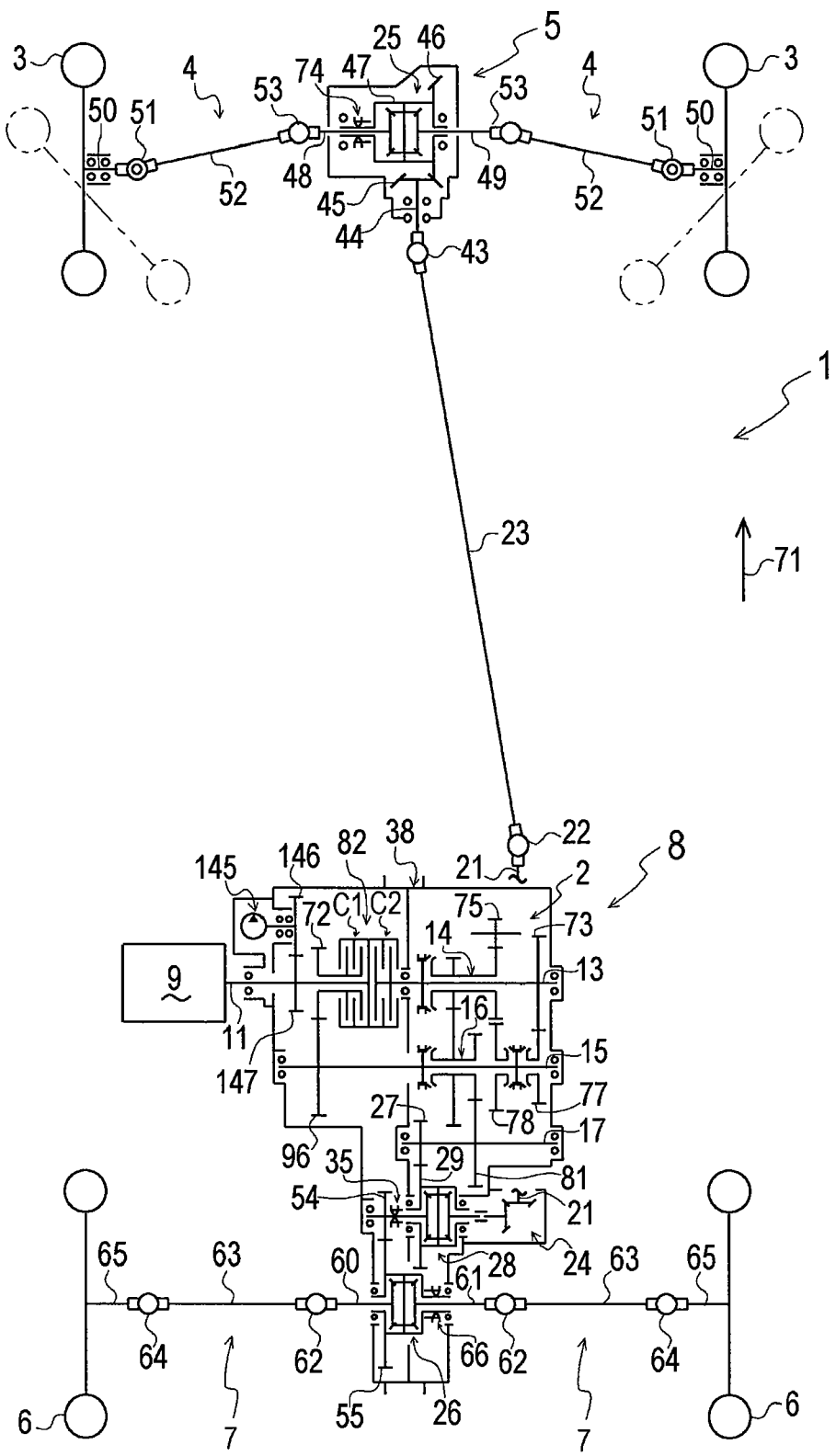
FIG. 1 is a plain view of an entire construction of a working vehicle 1 according to the present invention.

An entire structure of a working vehicle 1 equipped with a dual clutch transmission (hereinafter, referred to "DC transmission") 2 will be described with reference to FIGS. 1 to 4. Vehicle 1 faces forward in a direction designated by an arrow 71 in FIG. 1, and hereinafter, positions and directions of all members will be defined on the assumption that the forward direction of working vehicle 1 is designated by arrow 71.

Working vehicle 1 is provided at a front portion thereof with a front transaxle 5 supporting and driving a pair of right and left front axles 4 fixed to respective right and left front wheels 3. Working vehicle 1 is provided at a middle-and-rear portion thereof with a rear transaxle 8 supporting and driving a pair of right and left rear axles 7 fixed to respective right and left rear wheels 6. Working vehicle 1 is provided with an engine 9 on one of left and right sides (in this embodiment, on the left side) of rear transaxle 8.

Rear transaxle 8 includes a transaxle casing 38, which supports an input shaft 11 and right and left rear axles 7, and incorporates DC transmission 2 and differential gear assemblies 28 and 26. Input shaft 11 receives power from engine 9, and DC transmission 2 transmits the power from input shaft 11 to central differential gear assembly 28 through an output gear 27. Central differential gear assembly 28 differentially distributes the output of DC transmission 2 between differential yoke shafts 19 and 20. The rotary force of differential yoke shaft 19 is transmitted to a rear wheel differential gear assembly 26 in rear transaxle 8 so as to differentially drive right and left rear wheels 6. The rotary force of differential yoke shaft 20 is transmitted to a front wheel differential gear assembly 25 in front transaxle 5 in front of rear transaxle 8 through a front wheel driving PTO section 24 provided on rear transaxle 8 so as to differentially drive right and left front wheels 3.

Central differential gear assembly 28 comprises a hollow differential housing 30, a ring gear 29, a pinion shaft 32, bevel pinions 33 and right and left bevel differential side gears 34. Differential housing 30 is supported in rear transaxle 8 coaxially to differential yoke shafts 19 and 20. Ring gear 29 is fastened onto an outer circumference of differential housing 30 by bolts 31 and meshes with output shaft 27. Pinion shaft 32 is extended perpendicular to differential yoke shafts 19 and 20 in differential housing 30 rotatably integrally with differential housing 30. Opposite bevel pinions 33 are relatively rotatably disposed on pinion shaft 32. Bevel differential side gears 34 are fixed on proximal end portions of respective differential yoke shafts 19 and 20 and mesh with pinions 33.

Accordingly, the rotary force of ring gear 29 driven by the output of DC transmission 2 through output gear 27 is differentially distributed between rear wheel differential gear assembly 26 and front transaxle 5 through respective differential yoke shafts 19 and 20.

Incidentally, central differential gear assembly 28 is provided with a differential lock mechanism 35 so as to lock the differential rotation of differential yoke shafts 19 and 20. Differential lock mechanism 35 comprises a differential lock slider 36. Differential lock slider 36 is axially slidably fit onto an outer circumference of one of differential yoke shafts 19 and 20 (in this embodiment, differential yoke shaft 19). Ring gear 29 is formed with recesses 29a, and salients 36a are formed on a surface of differential lock slider 36 facing ring gear 29 so as to correspond to respective recesses 29a. By sliding differential lock slider 36, salients 36a are engaged into respective recesses 29a so as to connect differential yoke shaft 19 integrally in a rotatable manner to differential housing 30, thereby differentially locking central differential gear assembly 28, i.e., driving right and left differential yoke shafts 19 and 20 at an equal rotary speed. Differential lock slider 36 is operatively connected to a differential lock operation device such as a lever (not shown) via a linkage (not shown). Therefore, central differential gear assembly 28 is differentially locked or unlocked by operation of the differential lock operation device, thereby improving working vehicle 1's performance for straight traveling and traveling in mud.

Front-wheel driving PTO section 24 includes a PTO housing 40 convexly provided on one of the right and left sides of transaxle casing 38. Differential yoke shaft 20 is extended laterally outward from transaxle casing 38, and is connected to a transmission shaft 39 via a coupling 37. Transmission shaft 39 projects into PTO housing 40, and is fixedly provided thereon with a bevel gear 41 in PTO housing 40. PTO housing 40 journals a fore-and-aft extended PTO shaft 21 projecting forward therefrom. In PTO housing 40, PTO shaft 21 is fixedly provided thereon with a bevel gear 42 meshing with bevel gear 41.

PTO shaft 21 is connected to an input shaft 44 of front transaxle 5 through a universal joint 22, a propeller shaft 23, and a universal joint 43, thereby transmitting the power from engine 9 to right and left front wheels 3.

In front transaxle 5, a bevel gear 45 fixed on input shaft 44 meshes with a ring gear 46 of front wheel differential gear assembly 25. In front wheel differential gear assembly 25, ring gear 46 is rotatably integrally provided on a differential casing 47, and right and left differential yoke shafts 48 and 49 are fitted into differential casing 47. Each of the differential yoke shafts 48 and 49 is drivingly connected at a distal end thereof to each of front wheel axles 50 serving as central axes of respective steerable front wheels 3 via a universal joint 53, a half shaft 52 and a universal joint 51. Front wheel differential gear assembly 25 is provided with a differential lock mechanism 74, similar to central differential gear assembly 28 with differential lock mechanism 35.

Further, similar to central differential gear assembly 28, in rear wheel differential gear assembly 26, a ring gear 55 is rotatably integrally provided on a differential casing 56 and meshes with an output gear 54 formed on a distal end of differential yoke shaft 19. A pinion shaft 58 pivoting a pair of opposite differential pinions 57 is rotatably integrally provided in differential casing 56. Right and left differential side gears 59 are fixed on proximal ends of respective differential yoke shafts 60 and 61 and mesh with differential pinions 57. Each of differential yoke shafts 60 and 61 is drivingly connected at a distal end thereof to each of rear wheel axles 65 serving as central axes of respective rear wheels 6 via a universal joint 62, a half shaft 63 and a universal joint 64. Rear wheel differential gear assembly 26 is provided with differential lock mechanism 66, similar to front wheel differential gear assembly 25 with differential lock mechanism 74.

A structure of DC transmission 2 will be described with reference to FIGS. 2 to 9. Transaxle casing 38 of rear transaxle 8, which incorporates DC transmission 2, includes a left casing 68, a central casing 69, a right casing 70. A seal casing 67 is attached to a vertical outside (left) surface of an upper portion of left casing 68. Front wheel driving PTO housing 40 is attached to a vertical outside (right) surface of a substantially vertically middle portion of right casing 70. Input shaft 11, a second clutch output shaft 13 extended coaxially to input shaft 11, an intermediate shaft 18, a speed change shaft 15, a transmission output shaft 17, coaxial differential yoke shafts 19 and 20, and coaxial differential yoke shafts 60, 61 are extended in transaxle casing 38 in the laterally horizontal direction of vehicle 1 and in parallel to one another.

On the assumption that engine 9 is disposed on the left side of rear transaxle 8, input shaft 11 projects leftwardly outward from a seal casing 67 provided on the left end of transaxle casing 38. In transaxle casing 38, input shaft 11 penetrating seal casing 67 is extended rightward, and second clutch output shaft 13 is coaxially extended rightward from input shaft 11. A leftwardly opened cup-shaped portion 13a is formed on the left end of second clutch output shaft 13 and is journalled by central casing 69 via a bearing. Second clutch output shaft 13 is journalled at the right end portion thereof by a right wall of right casing 70 via a bearing 186. A right end portion of input shaft 11 is relatively rotatably fitted into cup-shaped portion 13a of second clutch output shaft 13 via a bearing. Cylindrical first clutch output shaft 12 is relatively rotatably and externally attached onto input shaft 11 via a bearing.

A dual clutch unit 82, including a first clutch C1 and a second clutch C2, is provided around input shaft 11 in transaxle casing 38. Dual clutch unit 82 includes a clutch housing 82a shared between first and second clutches C1 and C2. Clutch housing 82a is fixed at a central boss portion thereof on input shaft 11 between first clutch output shaft 12 and cup-shaped portion 13a. Clutch housing 82a is formed integrally with a partition portion 82b, a left drum-shaped portion and a right drum-shaped portion as well as the central boss portion. Partition portion 82b is extended radially outward from the central boss portion. The left drum-shaped portion is extended leftward from the outer peripheral end of partition portion 82b and is disposed around a right portion of first clutch output shaft 12. The right drum-shaped portion is extended rightward from the outer peripheral end of partition portion 82b and is disposed around cup-shaped portion 13a of second clutch output shaft 13.

In a chamber on the left side of partition portion 82b between the right portion of the first clutch output shaft 12 and the left drum-shaped portion of clutch housing 82a, friction elements, which are relatively unrotatably and axially slidably fit to the right portion of first clutch output shaft 12, and friction elements, which are relatively unrotatably and axially slidably fit to the left drum-shaped portion of clutch housing 82a, are alternately aligned in the axial direction of input shaft 11, so as to constitute first clutch C1 interposed between input shaft 11 and first clutch output shaft 12. On the other hand, in a chamber on the right side of partition portion 82b between cup-shaped portion 13a of second clutch output shaft 13 and the right drum-shaped portion of clutch housing 82a, friction elements, which are relatively unrotatably and axially slidably fit to cup-shaped portion 13a, and friction elements, which are relatively unrotatably and axially slidably fit to the right drum-shaped portion of clutch housing 82a, are alternately aligned in the axial direction of the input shaft 11, so as to constitute second clutch C2 interposed between input shaft 11 and second clutch output shaft 13.

In dual clutch unit 82, first and second clutches C1 and C2 are hydraulically activated clutches. In this regard, in a cylinder 79 of first clutch C1 formed in clutch housing 82a on the left side of partition portion 82b, a first piston 86 is disposed axially slidably along the central boss portion and left drum-shaped portion of clutch housing 82a, and is biased toward partition portion 82b by a spring 85. When oil is supplied into a cylinder chamber 83 between partition portion 82b and first piston 86, the oil pushes first piston 86 leftward against spring 85 so as to press the friction elements against one another, thereby engaging first clutch C1. On the other hand, in a cylinder 80 of second clutch C2 formed in clutch housing 82 on the right side of partition portion 82b, a second piston 87 is disposed axially slidably along the central boss portion and right drum-shaped portion of clutch housing 82, and is biased toward partition portion 82b by a spring 85. When oil is supplied into a cylinder chamber 84 between partition portion 82b and second piston 87, the oil pushes second piston 87 rightward against spring 85 so as to press the friction elements against one another, thereby engaging second clutch C2.

In dual clutch unit 82, fluid passages 88, 89 and 90 are formed in input shaft 11, and are opened at one end thereof on the outer circumference surface of the outer (left) end portion of input shaft 11. Fluid passage 88 communicates at the one end thereof with a solenoid proportional reducing valve 91 for controlling the hydraulic pressure of the hydraulic oil to first clutch part C1. Fluid passage 89 communicates at the one end thereof with a solenoid proportional reducing valve 92 for controlling the hydraulic pressure of the hydraulic oil to second clutch C2. Fluid passage 90 communicates at the one end thereof with a changeover valve 93 for controlling the supply and discharge of lubricant oil to and from second clutch C2. Fluid passage 88 communicates at the other end thereof with cylinder chamber 83 between partition portion 82b and first piston 86. Fluid passage 89 communicates with cylinder chamber 84 between partition portion 82b and second piston 87. Fluid passage 90 is bifurcated at the other end thereof to communicate with gaps between the inner circumference surfaces of respective pistons 86 and 87 and the outer circumference surface of input shaft 11, thereby supplying lubricant oil for the slide of pistons 86 and 87.

Figure 9:
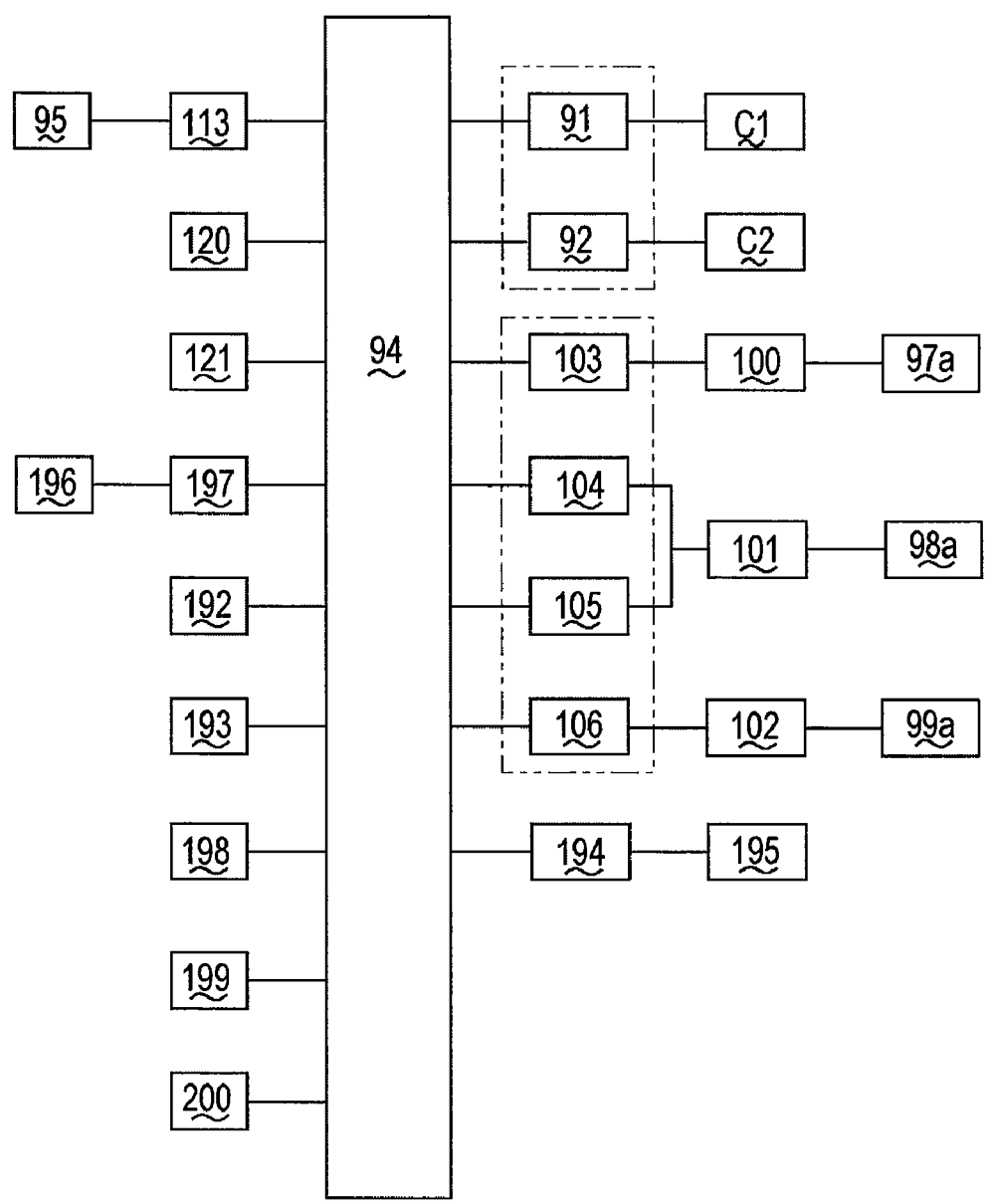
FIG. 9 is a block diagram of a gearshift control system of the dual clutch transmission.

An electronic control system for gearshifting DC transmission 2 is configured as shown in FIG. 9. Working vehicle 1 is provided with a speed change operation lever 95 serving as a manipulator for operating DC transmission 2. A lever position sensor 113 is provided to detect an operation position of speed change operating lever 95. A position detection signal corresponding to the position of lever 95 is transmitted from sensor 113 to a controller 94. Further, an accelerator sensor 120 for detecting the depression of an accelerator pedal (not shown) and a vehicle speed sensor 121 for detecting the actual traveling speed of working vehicle 1 transmit respective detection signals to controller 94. According to the signals from these sensors, controller 94 commands to excite/non-excite solenoids of valves 91 and 92 for first and second clutches C1 and C2.

When the solenoid of valve 91 is excited, the hydraulic oil is supplied through fluid passage 88 into cylinder chamber 83 of first clutch C1, so that first piston 86 is thrust to the friction elements against the bias power of return spring 85 so as to press the friction elements against one another, thereby gradually engaging first clutch C1. When the solenoid of valve 91 is unexcited, the supply of the hydraulic oil with cylinder chamber 83 is blocked, so that first piston 86 is withdrawn from the friction elements by the bias power of return spring 85 so as to separate the friction elements from one another, thereby disengaging first clutch C1. When the solenoid of valve 92 is excited, the hydraulic oil is supplied through fluid passage 89 into cylinder chamber 84 of second clutch C2, so that second piston 87 is thrust to the friction elements against the bias power of return spring 85 so as to press the friction elements against one another, thereby gradually engaging second clutch C2. When the solenoid of valve 92 is unexcited, the supply of the hydraulic oil with cylinder chamber 84 is blocked, so that second piston 87 is withdrawn from the friction elements by the bias power of return spring 85 so as to separate the friction elements from one another, thereby gradually disengaging second clutch part C2.

Figure 2:
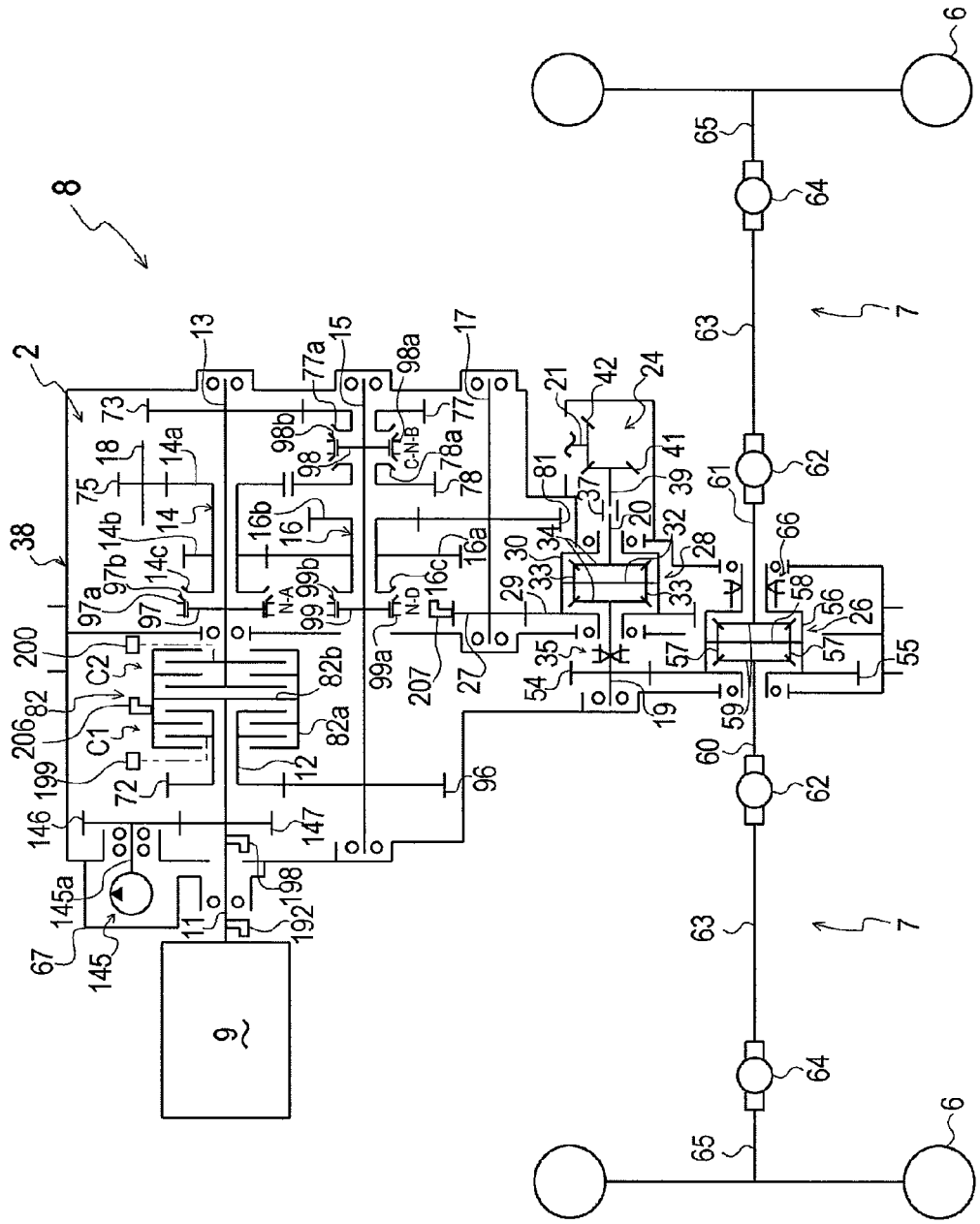
FIG. 2 is a skeleton diagram of a power transmission structure of a rear transaxle.
Figure 4:
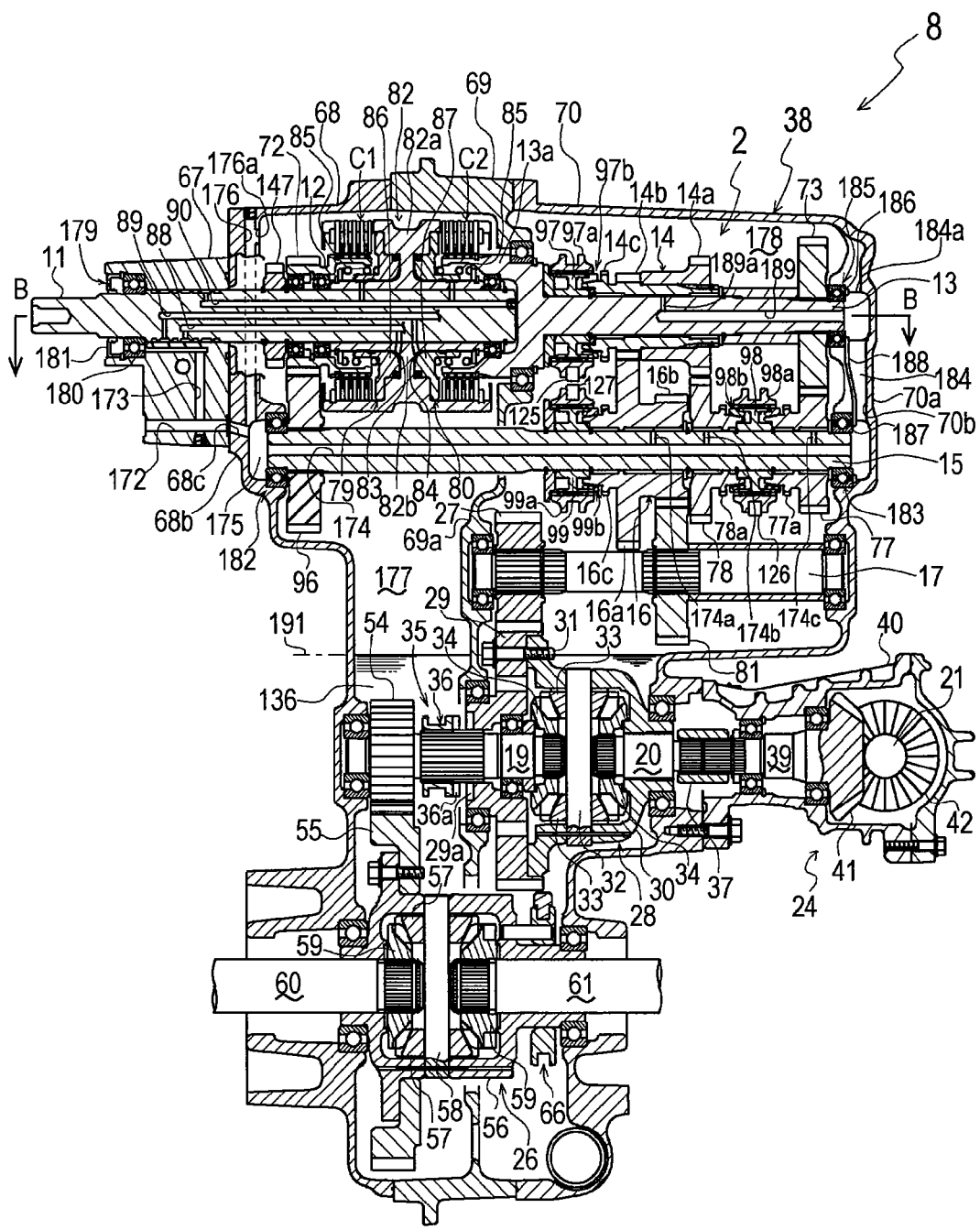
FIG. 4 is a cross sectional view of FIG. 3 along a line A-A.

As shown in FIGS. 2 and 4, a diametrically small gear 72 is formed on the outer circumference of first clutch output shaft 12. Gear 72 meshes with a diametrically large gear 96 fixed on speed change shaft 15. When first clutch C1 is engaged, the power from input shaft 11 is transmitted to speed change shaft 15 via engaged first clutch C1, first clutch output shaft 12, gear 72 and gear 96.

A deceleration gear 16, a reversing gear 78 and a gear 77 are relatively rotatably fitted onto speed change shaft 15. A deceleration gear 14 is relatively rotatably provided on second clutch output shaft 13. A gear 73 is fixed on deceleration gear 14. Output gear 27 and a diametrically large gear 81 are fixed on transmission output shaft 17. Both of deceleration gears 14 and 16 are double gears each integrally consisting of diametrically large and small gears. Deceleration gear 14 comprises a diametrically large gear 14a and a diametrically small gear 14b. Deceleration gear 16 comprises a diametrically large gear 16a and a diametrically small gear 16b.

The above-mentioned diametrically small gear 72 and a diametrically large gear 96 mesh with each other so as to constitute a first deceleration gear train. Diametrically small gear 14b of deceleration gear 14 and diametrically large gear 16a of deceleration gear 16 mesh with each other so as to constitute a second deceleration gear train. Diametrically small gear 16b of deceleration gear 16 and diametrically large gear 81 mesh with each other so as to constitute a third deceleration gear train. Further, backward-driving gear 78 meshes with an idle gear 75 on intermediate shaft 18. Idle gear 75 meshes with diametrically large gear 14a of deceleration gear 14. Reversing gear 78, idle gear 75 and diametrically large gear 14a constitute a reversing gear train. Gears 77 and 73 mesh with each other so as to constitute an adjusting gear train. These various gear trains having various gear ratios and rotation directions can create the respective speed stages.

A third spline hub 99 is relatively unrotatably engaged onto the speed change shaft 15 on one side (the left side in this embodiment) of deceleration gear 16 via a synchronization mechanism 99b such as a synchromesh. A second spline hub 98 is relatively unrotatably engaged on speed change shaft 15 via a synchronization mechanism 98b between reversing gear 78 and gear 77. Also, a first spline hub 97 is relatively unrotatably engaged onto second clutch output shaft 13 via a synchronization mechanism 97b on one side (the left side in this embodiment) of deceleration gear 14.

A first shifter 97a is axially slidably and relatively unrotatably engaged onto first spline hub 97. A second shifter 98a is axially slidably and relatively unrotatably engaged onto second spline hub 98. A third shifter 99a is axially slidably and relatively unrotatably engaged onto third spline hub 99. A clutch-teethed portion 14c is formed on an end of deceleration gear 14 facing first spline hub 97. A clutch-teethed portion 16c is formed on an end of deceleration gear 16 facing third spline hub 99. Clutch-teethed portions 77a and 78a are formed on respective ends of gears 77 and 78 facing second spline hub 98 therebetween.

Figure 5:
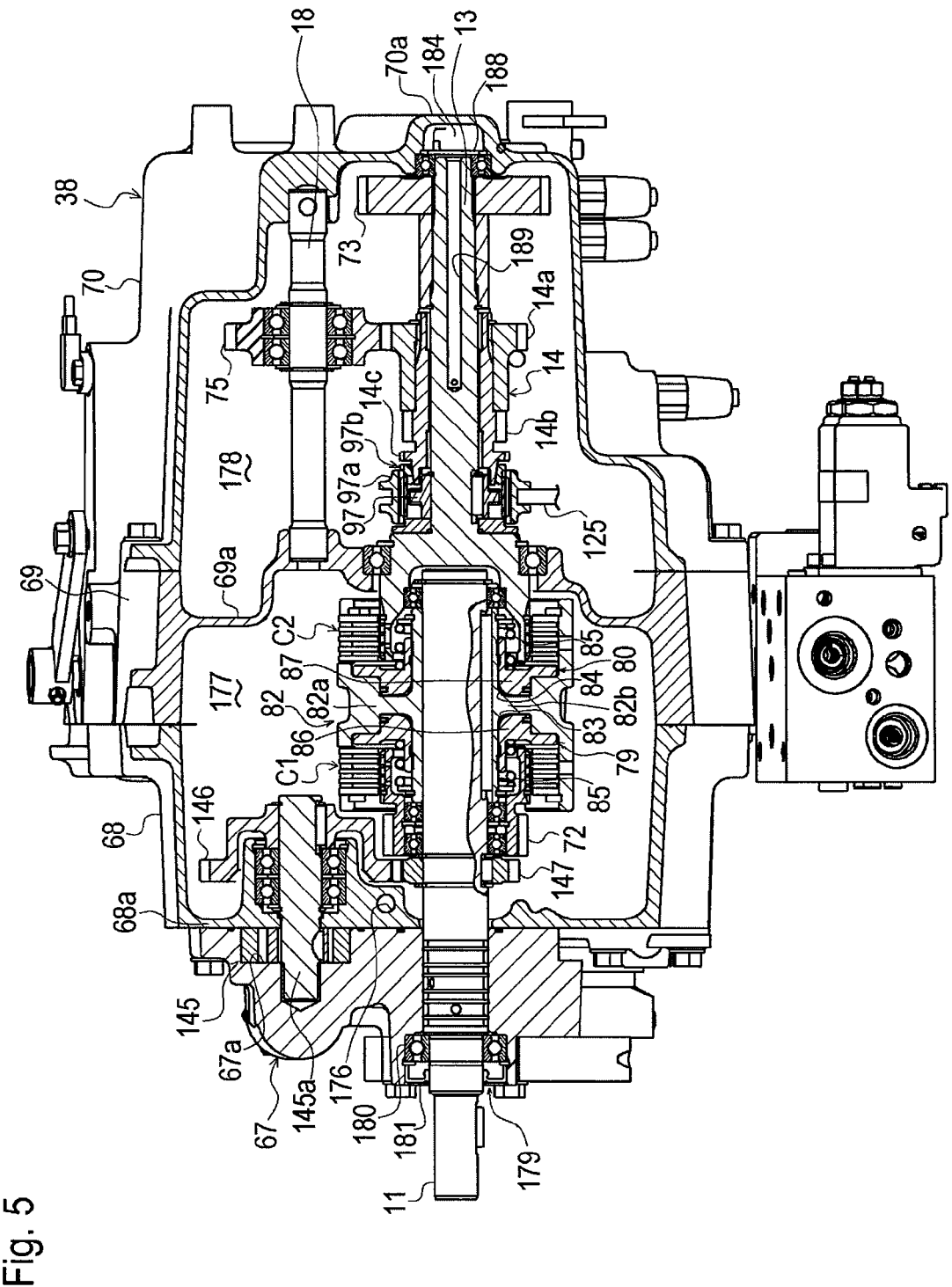
FIG. 5 is a cross sectional view of FIG. 4 along a line B-B.
Figure 6:
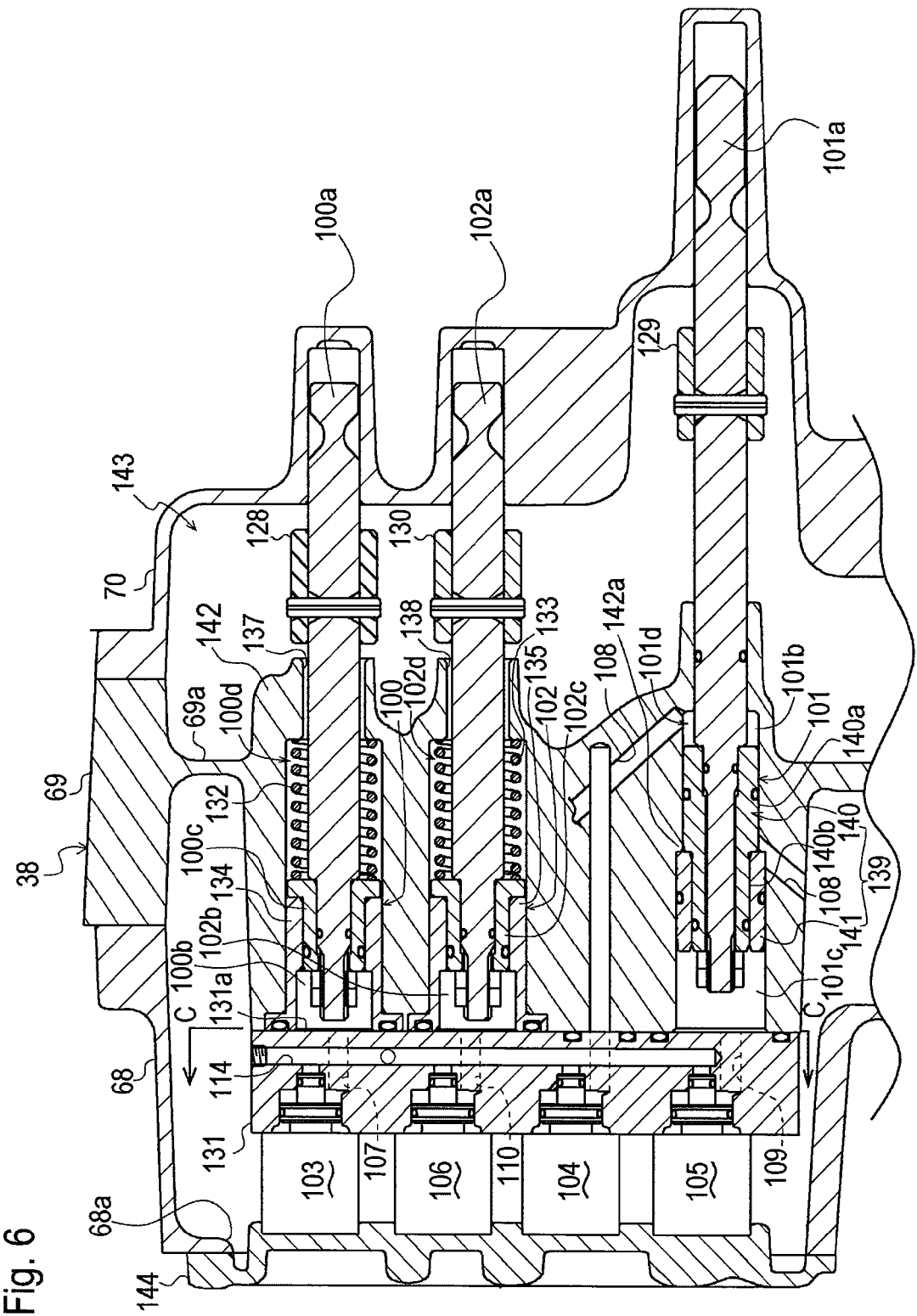
FIG. 6 is a sectional rear view of a rear portion of the rear transaxle illustrating a shifter operation mechanism.

As shown in FIG. 6, a shifter operation mechanism 143 is provided in transaxle casing 38 so as to control shifts of these shifters 97a, 98a and 99a among predetermined positions. Shifter operation mechanism 143 includes first, second and third hydraulic cylinders 100, 101 and 102 serving as hydraulic actuators for sliding shifters 97a, 98a and 99a. A fork 125 fitted on first shifter 97a (see FIGS. 4 and 5) is fixed at a boss 128 thereof on a piston rod 100a of first cylinder 101. Similarly, a fork 126 fitted on second shifter 98a is fixed at a boss 129 thereof on a piston rod 101a of second cylinder 101, and a fork 127 fitted on third shifter 99a is fixed at a boss 130 thereof on a piston rod 102a of third cylinder 102. Central casing 69 is formed with a cylinder block portion 142 in which hydraulic cylinders 100, 101 and 102 are formed so as to extend laterally in parallel to one another. A valve support block 131 is fixed at a right side surface 131a thereof to a left end surface of cylinder block portion 142 so as to define the left ends of hydraulic cylinders 100, 101 and 102. A solenoid changeover valve 103 is provided for first cylinder 100 and first shifter 97a. Solenoid changeover valves 104 and 105 are provided for second cylinder 101 and second shifter 98a. Solenoid changeover valve 106 is provided for third cylinder 102 and third shifter 99a. Solenoid changeover valves 103, 104, 105 and 106 are fixedly fitted rightward into valve support block 131 laterally opposite to cylinder block portion 142 as shown in FIG. 6, and are electrically connected to controller 94 in the electronic control system for DC transmission 2 as shown in FIG. 9.

First hydraulic cylinder 100 includes a cylinder chamber 100d which is formed in cylinder block portion 142 and is closed at a left aperture thereof by right side surface 131a of valve support block 131. A fluid chamber 100b is formed in cylinder chamber 100d between right side surface 131a and a left end of a piston 100c fixed on one (left) end portion of piston rod 100a. Fluid chamber 100b is connected to solenoid changeover valve 103 via a fluid passage 107 formed in valve support block 131. A return spring 132 is wound around piston rod 100a between a right side of piston 100c and a right inner wall of cylinder chamber 100d so as to bias piston 100c toward fluid chamber 100b. A stopper 134 is fixed to an inner peripheral surface of cylinder chamber 100d so as to define a left limit position of piston 100c for preventing piston 100c from sliding further leftward therefrom.

Similarly, third hydraulic cylinder 102 includes a cylinder chamber 102d which is formed in cylinder block portion 142 and is closed at a left aperture thereof by right side surface 131a of valve support block 131. A fluid chamber 102b is formed in cylinder chamber 102d between right side surface 131a and a piston 102c provided on one (left) end of piston rod 102a. Fluid chamber 102b is connected to solenoid changeover valve 106 via a fluid passage 110 formed in valve support block 131. A return spring 133 is wound around piston rod 102a between a right side of the piston 102c and a right inner wall of cylinder chamber 102d so as to bias piston 102c toward fluid chamber 102b. A stopper 135 is fixed to an inner peripheral surface of cylinder chamber 102d so as to define a left limit position of piston 102c for preventing piston 102c from sliding further leftward therefrom.

Figure 8:
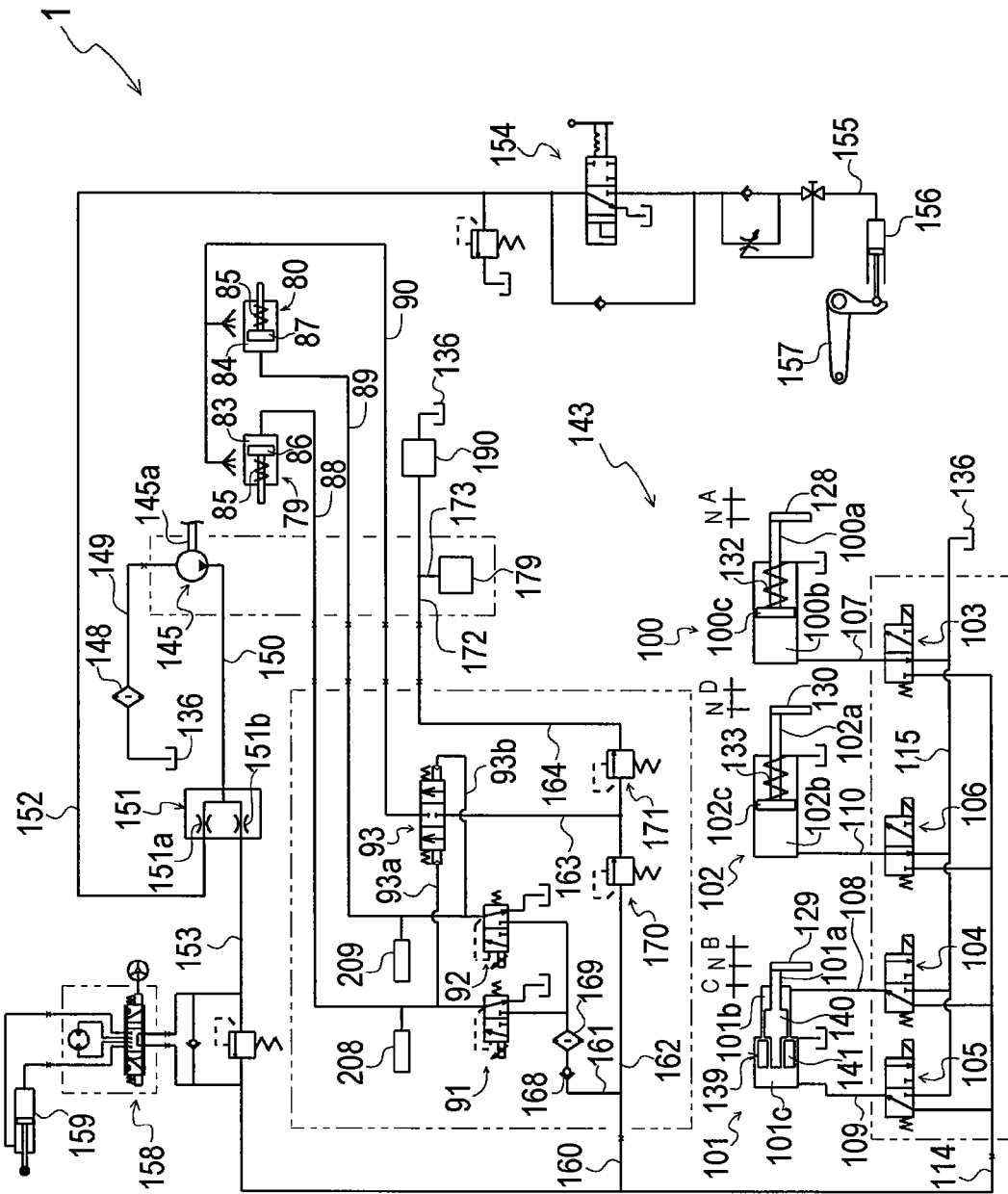
FIG. 8 is a diagram of a hydraulic circuit of working vehicle 1.

Due to this structure, as shown in FIG. 8, when a solenoid of either valve 103 or 106 is unexcited so as to set corresponding hydraulic cylinder 100 or 102 at its neutral position, corresponding piston 100c or 102c biased by spring 132 or 133 abuts against a shoulder of corresponding stopper 134 or 135 so as to be retained at the position. The position where each of pistons 100c and 102c abutting against corresponding stopper 134 or 135 is defined as a neutral position N of each of pistons 100c and 102c. In this state, solenoid change over valve 103 or 106 opens corresponding fluid chamber 100b or 102b to a fluid sump 136 through a common fluid passage 115, thereby preventing corresponding piston 100c or 102c from receiving waste pressure, and thereby accurately retaining piston 100c or 102c.

When the solenoid of either valve 103 or 106 is excited, valve 103 or 106 supplies clutch-operation fluid into corresponding fluid chamber 100b or 102b through a common fluid passage 114 formed in valve support block 131. Due to the fluid supply into fluid chamber 100b against spring 132, piston 100c reaches a position A so that shifter 97a meshes with clutch-teethed portion 14c (see FIGS. 2 and 8). Due to the fluid supply into fluid chamber 102b against spring 133, piston 102c reaches a position D so that shifter 99a meshes with clutch-teethed portion 16c (see FIGS. 2 and 8).

Piston rods 100a and 102a project outward from the cylinder block portion so as to be supported at right end portions thereof by a wall of right casing 70. Bosses 128 and 130 of forks 125 and 127 are fixed on respective piston rods 100a and 102a between cylinder block portion 142 and the wall of right casing 70. In cylinder block portion 142, annular gaps 137 and 138 are provided between respective piston rods 100a and 102a and the wall of cylinder block portion 142 so that fluid compressed by rightward sliding of each of pistons 100c and 102c can be quickly released from each cylinder 100 or 102 through corresponding gap 137 or 138 to fluid sump 136 in transaxle casing 38.

In this way, each of hydraulic cylinders 100 and 102 is a single-action cylinder in which corresponding fluid chamber 100b or 102b is disposed on only one side of its piston 100c or 102c, and corresponding return spring 132 or 133 on the other opposite side of its piston 100c or 102c. This arrangement thereby reduces costs for accurately forming fluid chambers and costs for connecting pipes and valves to fluid passages for supplying fluid to the respective fluid chambers, because the number of fluid chambers and the number of fluid passages for supplying the fluid chambers of these cylinders are reduced in comparison with a double-action cylinder including opposite fluid chambers on both sides of its piston.

A cylinder chamber 101d of second hydraulic cylinder 101 is formed in cylinder block portion 142 and is closed at the left aperture thereof by right side surface 131a of valve support block 131, similar to cylinder chambers 100d and 102d of cylinders 100 and 102. A main piston 140 including a diametrically large portion 140a and a diametrically small portion 140b is fixed on one end of piston rod 101a. A cylindrical sub piston 141 is axially slidably fitted on diametrically small portion 140b of main piston 140 and has a diameter larger than that of diametrically large portion 140a of main piston 140. Main piston 140a and sub piston 141 constitute a piston 139. Second cylinder 101 is a double-action cylinder including a left fluid chamber 101b and a right fluid chamber 101c disposed on opposite sides of piston 139. Solenoid change over valves 104 and 105 are connected to respective fluid chambers 101b and 101c.

Due to this structure, as shown in FIG. 8, when solenoids of both valve 104 and 105 are unexcited so as to set second hydraulic cylinder 101 at its neutral position, valves 104 and 105 supply fluid to both opposite fluid chambers 101b and 101c through respective fluid passages 108 and 109. In this state, since one side area of piston 139 receiving the hydraulic pressure of fluid chamber 101c is larger than the other side area of piston 139 receiving the hydraulic pressure of fluid chamber 101b, piston 139 is pushed toward fluid chamber 101b by the differential pressure between fluid chambers 101b and 101c so that an outer peripheral edge of sub piston 141 abuts against a shoulder 142a of cylinder block portion 142, thereby accurately retaining piston 139 at a neutral position N.

When the solenoid of valve 104 is excited and the solenoid of valve 105 is not excited, valve 104 drains fluid from fluid chamber 101b and piston 139 receives the hydraulic pressure of fluid in fluid chamber 101c supplied by valve 105 so that, while sub piston 141 is retained by shoulder 142a, main piston 140 slides rightward and abuts against a distal end of fluid chamber 101b defined as a position B, thereby engaging second shifter 98a with clutch-teethed portion 77a (see FIGS. 2 and 8). When the solenoid of valve 104 is not excited and the solenoid of valve 105 is excited, valve 105 drains fluid from fluid chamber 101c and piston 139 receives the hydraulic pressure of fluid in fluid chamber 101b supplied by valve 104 so that both main piston 140 and sub piston 141 slide leftward and abut against a distal end of fluid chamber 101c defined as position C, thereby engaging second sifter 98a with clutch-teethed portion 78a.

In shifter operation mechanism 143, due to a gearshift command signal issued from controller 94, each of solenoids of valves 103, 104, 105 and 106 is determined to be excited or unexcited. As mentioned later, some gearshift patterns need the switching of excitation/non-excitation of solenoids of valves 103, 104, 105 and 106, and the other gearshift patterns do not need this switching. When the solenoid of any valve 103, 104, 105 or 106, the corresponding piston moves so that the shifter interlocking with the piston also moves and meshes with one of the clutch-teethed portions through the corresponding synchromesh so as to relatively unrotatably engage the corresponding gear to second clutch output shaft 13 or speed change shaft 15. The gear train including the relatively engaged gear is referred to as the gear train selected to be activated.

As mentioned above, all cylinder chambers 100d, 101d and 102d of respective hydraulic cylinders 100, 101 and 102 are closed by right side surface 131a of valve support block 131. In other words, valve support block 131 supporting solenoid change over valves 103, 104, 105 and 106 also serves as a part of each of cylinders 100, 101 and 102, thereby reducing the number of parts and costs. Further, valve support block 131 can be removed from cylinder block portion 142 so as to easily open cylinder chambers 100d, 101d and 102d, thereby facilitating maintenance.

Solenoid change over valves 103 to 106 are disposed in left casing 68 of transaxle casing 38 and are interposed between valve support block 131 and a cover 144 covering a left aperture 68a of left casing 68, thereby requiring no large valve cover that would be required if valves 103 to 106 are exposed on transaxle casing 38. Single valve support block 131 is formed therein with fluid ports corresponding to respective valves 103 to 106 so that valve support block 131 and valves 103 to 106 attached to valve support block 131 can be treated as one assembly unit, thereby improving the assembility of transaxle casing 38 for manufacture or maintenance of transaxle 8.

Figure 7:
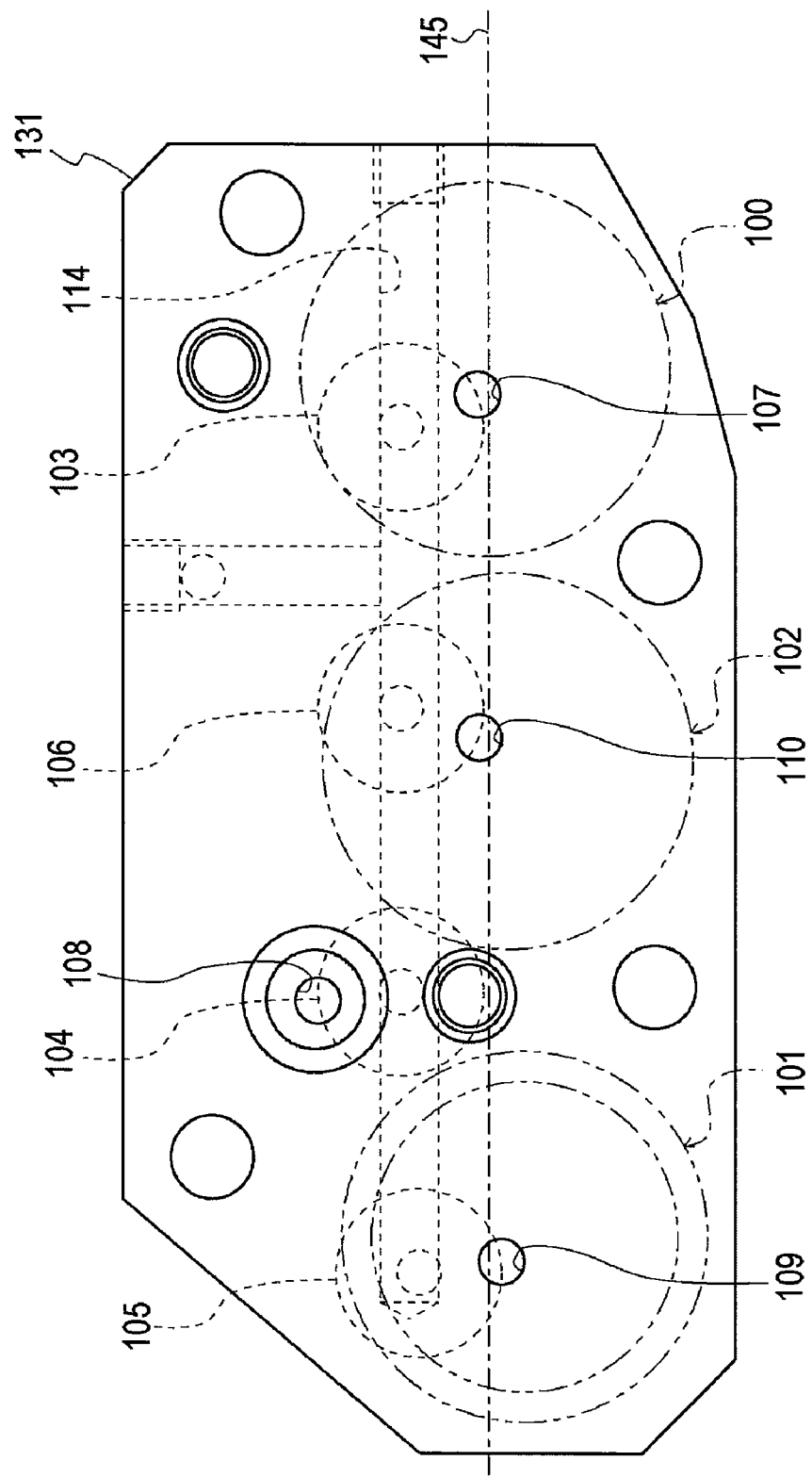
FIG. 7 is a cross sectional view of FIG. 6 along a line C-C, illustrating a solenoid valve support block.

As shown in FIG. 7, solenoid change over valves 103 to 106 are substantially linearly aligned along fluid passage 114 in parallel to one another, so that hydraulic cylinders 100, 101 and 102 are substantially linearly aligned in parallel to one another along a line 145 parallel to fluid passage 114. Therefore, sufficient spaces perpendicular to the alignment of the solenoid valves and the hydraulic cylinder valves can be ensured for works attaching valves 103 to 106 to block 131 and for configuring cylinders 100, 101 and 102 in cylinder block portion 142. Further, the set of solenoid valves 103 to 106 and the set of hydraulic cylinders 100, 101 and 102 are distributively arranged so as to be prevented from interfering with each other. In this way, shifter operation mechanism 143 including solenoid change over valves 103 to 106 and hydraulic cylinders 100 to 102 is easily assembled while ensuring its compactness.

Figure 10:
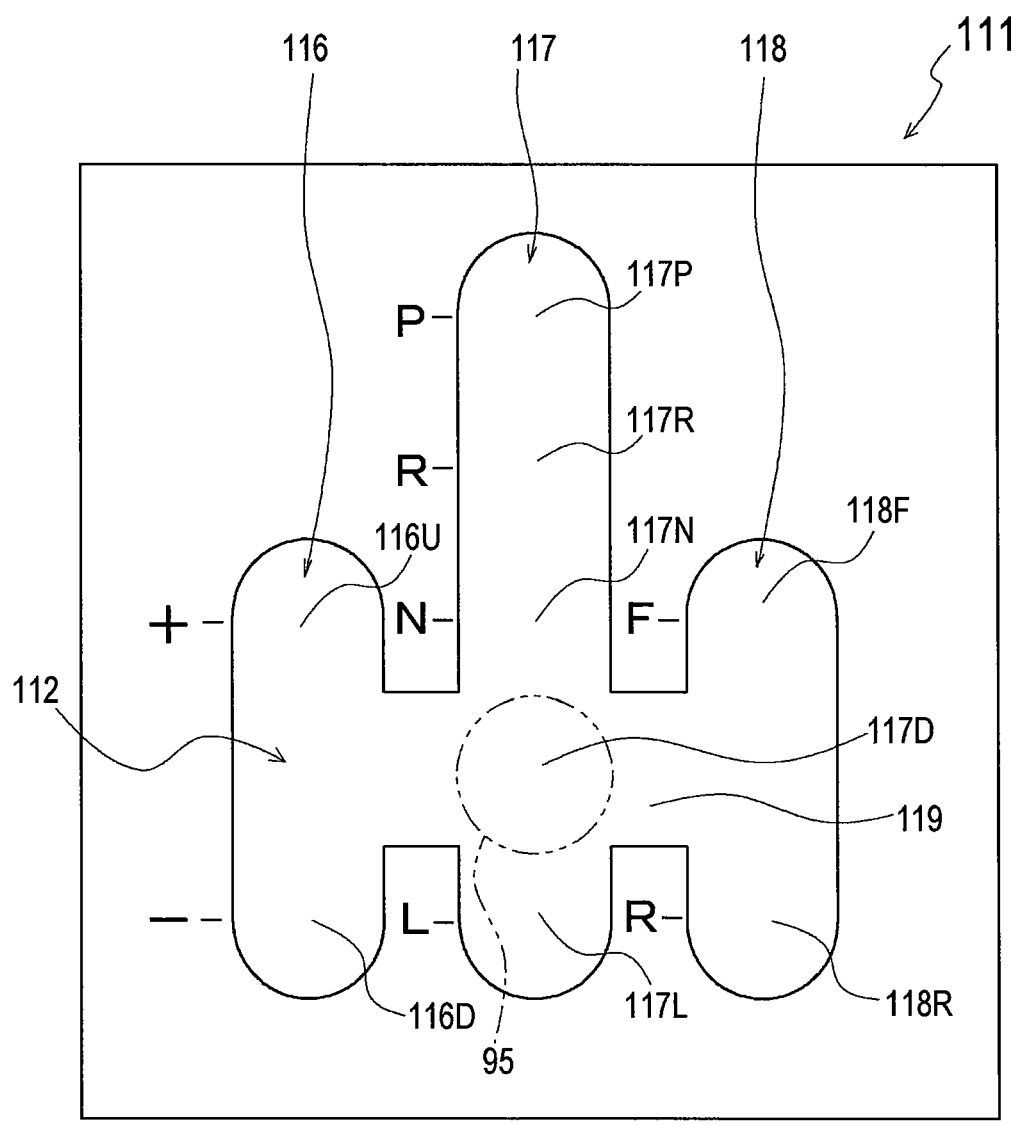
FIG. 10 is a plan view of a gearshift manipulation panel.

Description will now be given of a control system for the gearshift of DC transmission 2 with reference to FIGS. 2 and 8 to 13. A speed change operation panel 111 as shown in FIG. 10 is provided adjacent to an operator's seat (not shown) on working vehicle 1. A guide slot 112 is formed in panel 111 so as to guide lateral and longitudinal rotations of speed change operation lever 95 serving as a manipulator for gearshift of DC transmission 2. Guide slot 112 includes three parallel longitudinal slots 116, 117 and 118 extended in the fore-and-aft direction (they appear vertical in FIG. 10), and includes a pair of coaxial lateral slots 119. One lateral slot 119 is interposed between longitudinal slots 116 and 117, and the other lateral slot 119 is interposed between longitudinal slots 117 and 118.

Lever position sensor 113 detects the position of speed change operation lever 95 moving along guide slot 112 and transmits a position detection signal to controller 94. Accordingly, controller 94 issues the above-mentioned gearshift command signal to valves 91, 92, 103, 104, 105 and 106. Further, controller 94 issues a brake command signal to a parking brake (not shown).

Speed change operation lever 95 is normally rotated fore and aft in longitudinal slot 117. The mode depending on the rotation of lever 95 in slot 117, where one setting can be selected from settings, i.e., a parking brake setting, an automatic gearshift setting for automatically changing the forward traveling speed of DC transmission 2, a low speed setting for keeping the forward-traveling lowest speed of DC transmission 2, and a backward traveling setting for keeping the backward traveling speed of DC transmission 2. When speed change operation lever 95 is set at an automatic forward-traveling speed change position 117D in longitudinal slot 117, DC transmission 2 is automatically gearshifted to change the forward traveling speed so as to correspond to the accelerator position (e.g., the depression of an accelerator pedal or the opening degree of an engine throttle) and the vehicle speed (i.e., the actual traveling speed of working vehicle 1), and this setting is referred to as an automatic gearshift mode. Further, due to manual fore-and-aft rotation of speed change operation lever 95 along longitudinal slot 116, DC transmission 2 can be optionally gearshifted to change the forward traveling speed, and this setting is referred to as a manual gearshift mode, which belongs to the normal traveling mode.

When speed change operation lever 95 is disposed in longitudinal slot 118, a reverse mode is established. In the reverse mode, DC transmission 2 can be gearshifted between the predetermined forward-traveling speed and the forward-traveling speed. The reverse mode is convenient for works requiring frequent switching of the forward/backward traveling direction, such as scraping and carrying earth and sand by a front loader of working vehicle 1. The movement of speed change operation lever 95 among longitudinal slots 116, 117 and 118 depends on the lateral rotation of lever 95 along lateral slot 119.

A power train structure in the normal traveling mode will be described with reference to FIGS. 2, 10, 11(*a*), 12 and 13. When speed change operation lever 95 is disposed in position 117D so as to establish the automatic gearshift mode, the forward traveling speed is automatically determined and changed so as to correspond to the relation of the accelerator position (such as the depression of an accelerator pedal (not shown) or the opening degree of the throttle of engine 9) to the vehicle speed (i.e., the actual traveling speed of working vehicle 1).

To establish the forward-traveling first and second speed of DC transmission 2 in the automatic gearshift mode, shifter control mechanism 143 is controlled so that first shifter 97*a* is placed at position A so as to rotatably integrally engage deceleration gear 14 with second clutch output shaft 13. Second shifter 98*a* is placed at position B so as to rotatably integrally engage gear 77 with speed change shaft 15. Third shifter 99*a* is placed at position N so as to relatively rotatably disengage from speed change shaft 15.

As mentioned above, it is premised that gears 72 and 56 serve as the first deceleration gear train, gears 77 and 73 serve as the adjusting gear train, gears 14*b* and 16*a* serve as the second deceleration gear train, and gears 16*b* and 81 serve as the third deceleration gear train. In a state where first shifter 97*a* is disposed at position A, second shifter 98*a* is disposed at position B and third shifter 99*a* is disposed at position N, both a forward-traveling first speed drive train and a forward-traveling second speed drive train are simultaneously selected to be activated. In this regard, the forward-traveling first speed drive train is defined as the series connection of first clutch output shaft 12, the first deceleration gear train, speed change shaft 15, the adjusting gear train, second clutch output shaft 13, the second deceleration gear train and the third deceleration gear train. The forward-traveling second speed drive train is defined as the series connection of second clutch output shaft 13, the second deceleration gear train and the third deceleration gear train. This state is referred to as a forward-traveling low speed shifter state. When first clutch C1 is engaged and second clutch C2 is disengaged in the forward-traveling low speed shifter state, the forward-traveling first speed drive train is activated and the forward-traveling second speed drive train is idled. When first clutch C1 is disengaged and second clutch C2 is engaged in the forward-traveling low speed shifter state, the forward-traveling second speed drive train is activated and the forward-traveling first speed drive train is idled.

To activate the forward-traveling first speed drive train from the neutral state of DC transmission 2 with both clutches C1 and C2 disengaged by setting speed change operation lever 95 at a neutral position 117N, set speed change operation lever 95 is set to automatic forward-traveling speed change position 117D and by slightly depressing the accelerator pedal. Shifters 97*a*, 98*a* and 99*a* are then set into the forward-traveling low speed shifter state, and then, only first clutch C1 is engaged. Accordingly, the rotary force of input shaft 11 is transmitted to transmission output shaft 17 through engaged first clutch C1 and the forward-traveling first speed drive train is outputted as an output of forward-traveling first speed as the lowest speed of DC transmission 2 to front and rear axles 4 and 7 through output gear 27, central differential gear assembly 28 and the like.

To shift up DC transmission 2 from the forward-traveling first speed to the forward-traveling second speed, the forward-traveling low speed shifter state is kept, first clutch C1 having been engaged is disengaged, and second clutch C2 having been disengaged is engaged. Accordingly, the forward-traveling second speed drive train is activated so that the rotary force of input shaft 11 is transmitted to transmission output shaft 17 through engaged second clutch C2 and the forward-traveling second speed drive train so as to be outputted as the forward-traveling second speed output of DC transmission 2 to front and rear axles 4 and 7. On the contrary, to shift down DC transmission 2 from the forward-traveling second speed to the forward-traveling first speed, the forward-traveling low speed shifter state is kept, first clutch C1 having been disengaged is engaged, and second clutch C2 having been engaged is disengaged.

To shift up DC transmission 2 from the forward-traveling second speed to the forward-traveling third speed, shifter control mechanism 143 is controlled to move second shifter 98*a* from position B to position N, to move third shifter 99*a* from position N to position D, and to hold first shifter 97*a* at position A while keeping the disengagement of first clutch C1 and the engagement of second clutch C2. Due to the disengagement of first clutch C1, speed change shaft 15 constantly drivingly connected to first clutch output shaft 12 is idled so as to prevent the movement of first and second shifters 98*a* and 99*a* from suddenly changing the output rotary speed of DC transmission 2.

The state where first shifter 97*a* is set at position A, second shifter 98*a* is set at position N and third shifter 99*a* is set at position D, referred to as a forward-traveling middle speed shifter state. In the forward-traveling middle speed shifter state, both the above-mentioned forward-traveling second speed drive train and a forward-traveling third speed drive train are simultaneously selected to be activated. In this regard, the forward-traveling third speed drive train is defined as the series connection of first clutch output shaft 12, the first deceleration gear train, speed change shaft 15 and the third deceleration gear train. When first clutch C1 is engaged and second clutch C2 is disengaged in the forward-traveling middle speed shifter state, the forward-traveling third speed drive train is activated and the forward-traveling second speed drive train is idled. On the contrary, when first clutch C1 is disengaged and second clutch C2 is engaged in the forward-traveling middle speed shifter state, the forward-traveling second speed drive train is activated and the forward-traveling third speed drive train is idled.

In order to shift up from the forward-traveling second speed to the forward-traveling third speed, and switch from the forward-traveling low speed shifter state to the forward-traveling middle speed shifter state by shifter control mechanism 143, disengaged first clutch C1 is engaged and engaged second clutch C2 is disengaged, thereby activating the forward-traveling third speed drive train. In this state, the rotary force of input shaft 11 is transmitted to transmission output shaft 17 through engaged first clutch C1 and the forward-traveling third speed drive train so as to be outputted as the forward-traveling third speed output of DC transmission 2 to front and rear axles 4 and 7. On the contrary, to shift down DC transmission 2 from the forward-traveling third speed to the forward-traveling second speed, engaged first clutch C1 is disengaged and disengaged second clutch C2 is engaged while keeping the forward-traveling middle speed shifter state.

To shift up DC transmission 2 from the forward-traveling third speed to the forward-traveling fourth speed, while the engagement of first clutch C1 and the disengagement of second clutch C2 are kept, shifter control mechanism 143 is controlled to move first shifter 97a from position A to position N, second shifter 98a is controlled to move from position N to position B, and third shifter 99a is held at position D. Due to the disengagement of second clutch C2, second clutch output shaft 13 is idled so that the movement of first shifter 97a on second clutch output shaft 13 does not influence variation of the output rotary speed of DC transmission 2. Second shifter 98a moved to position B is moderated in engaging to gear 77 by synchromesh 98b.

The state where first shifter 97a is set at position N, second shifter 98a is set at position B and third shifter 99a is set at position D is referred to as a forward-traveling high speed shifter state. In the forward-traveling high speed shifter state, both of the above-mentioned forward-traveling third speed drive train and a forward-traveling fourth speed drive train are simultaneously selected to be activated. In this regard, the forward-traveling fourth speed drive train is defined as the series connection of second clutch output shaft 13, the adjusting gear train, speed change shaft 15 and the third deceleration gear train. When first clutch C1 is engaged and second clutch C2 is disengaged in the forward-traveling high speed shifter state, the forward-traveling third speed drive train is activated and the forward-traveling fourth speed drive train is idled. On the contrary, when first clutch C1 is disengaged and second clutch C2 is engaged in the forward-traveling high speed shifter state, the forward-traveling fourth speed drive train is activated and the forward-traveling third speed drive train is idled.

In order to shift up from the forward-traveling third speed to the forward-traveling fourth speed, and switch from the forward-traveling middle speed shifter state to the forward-traveling high speed shifter state by shifter control mechanism 143, engaged first clutch C1 is disengaged and disengaged second clutch C2 is engaged, thereby activating the forward-traveling fourth speed drive train. In this state, the rotary force of input shaft 11 is transmitted to transmission output shaft 17 through engaged second clutch C2 and the forward-traveling fourth speed drive train outputted as the forward-traveling fourth speed output of DC transmission 2 to front and rear axles 4 and 7. On the contrary, to shift down DC transmission 2 from the forward-traveling fourth speed to the forward-traveling third speed, disengaged first clutch C1 is engaged and engaged second clutch C2 is disengaged while keeping the forward-traveling high speed shifter state.

Consequently, understood from FIG. 11(a), each of the shift up and shift down processes of DC transmission 2 in the automatic gearshift mode is performed by shifting engagement between first and second clutches C1 and C2 so as to alternately engage/disengage clutches C1 and C2. In other words, one of clutches C1 and C2 having been disengaged is engaged, and meanwhile, the other of clutches C1 and C2 having been engaged is disengaged. This process for exchanging engagement/disengagement between clutches C1 and C2 is simply referred to as "clutch switching".

When the forward traveling second speed that has been established by shift up from the forward traveling first speed is further shifted up to the forward traveling third speed, the forward traveling low speed shifter state is changed to the forward traveling middle speed shifter state before the clutch switching, i.e., before first clutch C1 having been disengaged is engaged and second clutch C2 having been engaged is disengaged. When the forward traveling third speed that has been established by shift up from the forward traveling second speed is further shifted up to the forward traveling fourth speed, the forward traveling middle speed shifter state is changed to the forward traveling high speed shifter state before the clutch switching, i.e., before engaged first clutch C1 is disengaged and disengaged second clutch C2 is engaged. When the forward traveling third speed that has been established by shift down from the forward traveling fourth speed is further shifted down to the forward traveling second speed, the forward traveling high speed shifter state is changed to the forward traveling middle speed shifter state before the clutch switching, i.e., before engaged first clutch C1 is disengaged and disengaged second clutch C2 is engaged. When the forward traveling second speed that has been established by shift down from the forward traveling third speed is further shifted down to the forward traveling first speed, the forward traveling middle speed shifter state is changed to the forward traveling low speed shifter state before the clutch switching, i.e., before disengaged first clutch C1 is engaged and engaged second clutch C2 is disengaged.

All the shift up and shift down processes, except for the above-mentioned four processes, are performed only by the clutch switching without change of the shifter state. For example, when the forward traveling second speed having been established by shift up from the forward traveling first speed is shifted down to the forward traveling first speed, disengaged first clutch C1 is engaged and engaged second clutch C2 is disengaged while keeping the forward traveling low speed shifter state.

Figure 12:
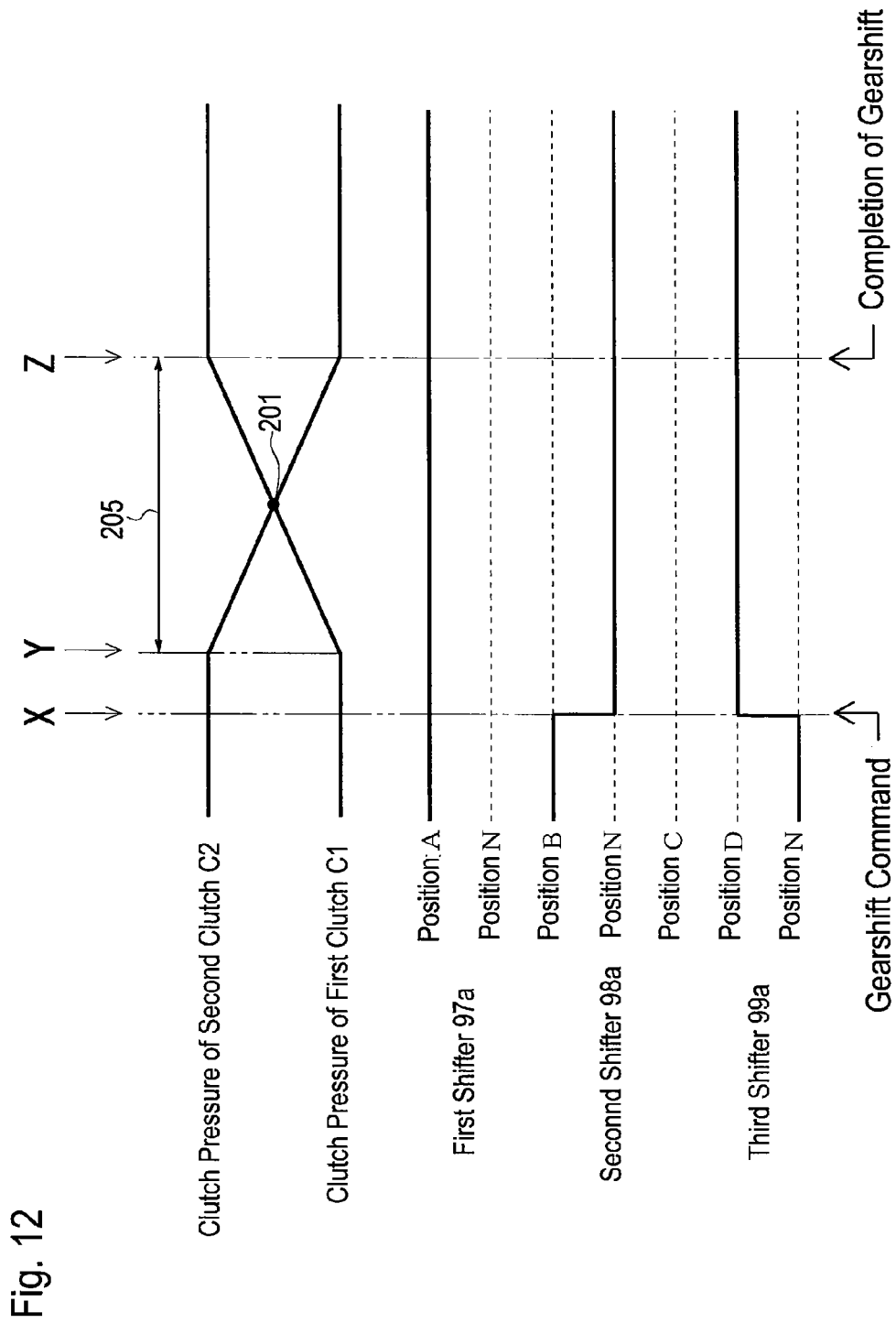
FIG. 12 is a diagram showing a representative process of gearshift by the dual clutch transmission.

FIG. 12 indicates variations in positions of shifters 97a, 98a and 99a and clutch pressures of first and second clutches C1 and C2 with the passage of time while the forward traveling second speed having been established by shift up from the forward traveling first speed is further shifted to the forward traveling third speed. Initially, at the setting of the forward traveling second speed by the shift up from the forward traveling first speed, first clutch C1 is disengaged with the minimum clutch pressure, second clutch C2 is engaged with the maximum clutch pressure, and the forward traveling low speed shifter state is established, i.e., first shifter 97a is set at position A, second shifter 98a is set at position B and third shifter 99a is set at position N.

Due to detection of the accelerator position and the vehicle speed, controller 94 issues a gearshift command signal at a timing X. Firstly, immediately after timing X, second shifter 98a is moved from position B to position N and third shifter 99a is moved from position N to position D, so as to change the forward traveling low speed shifter state to the forward traveling middle shifter state. At a timing Y after the completion of the change to the forward traveling middle speed shifter state, the engagement action of disengaged first clutch C1 and the disengagement action of engaged second clutch C2 are started. The clutch pressure of first clutch C1 is gradually increased so that the engagement action of first clutch C1 is gradually progressed from the disengagement state to the engagement state, and meanwhile, the clutch pressure of second clutch C2 is gradually decreased so that the disengagement action of second clutch C2 is gradually progressed from the engagement state to the disengagement state. Finally, at a timing Z, the clutch pressure of first clutch C1 becomes the maximum value so as to complete the engagement action of first clutch C1, and the clutch pressure of second clutch C2 becomes the minimum value so as to complete the disengagement action of second clutch C2, that is, the gearshift is completed so that the forward traveling third speed is established. For a clutch switching time 205 between timings Y and Z, the clutch pressure of first clutch C1 is gradually increased and the clutch pressure of second clutch C2 is gradually decreased with the passage through an equal pressure point where the clutch pressures of clutches C1 and C2 are substantially equal to each other. There is no clutch-off state where both clutches C1 and C2 are disengaged.

As mentioned above, the forward traveling middle speed shifter state is defined as the state where both of the forward traveling second speed drive train and the forward traveling third speed drive train are selected to be activated. Since the forward traveling middle speed shifter state has been established at timing X, the rotary force inputted to the forward traveling third speed drive train from input shaft 11 is increased along with the increase of clutch pressure of first clutch C1, and meanwhile, the rotary force inputted to the forward traveling second speed drive train from input shaft 11 is reduced along with the decrease of clutch pressure of second clutch C2. At equal pressure point 201, both of first and second clutches C1 and C2 are half-engaged so that the rotary force of input shaft 11 is substantially equally distributed between the forward traveling second speed drive train and the forward traveling third speed drive train. In this way, the gearshift from the activation of the forward traveling second speed drive train to the activation of the forward traveling third speed drive train is performed smoothly without sudden change of power transmission.

The above-mentioned clutch pressure control for gradually increasing/decreasing the clutch pressures of first and second clutches C1 and C2 for preset clutch switching time 205 with the passage through equal pressure point 201 is referred to as "cross wave control". The cross wave control is performed at every shift up or shift down process of DC transmission 2 during setting of the automatic gearshift mode, i.e., while speed change operation lever 95 is set at automatic forward traveling speed change position 117D.

As shown in FIG. 12, when the forward traveling second speed having been established by shift up from the forward traveling first speed is further shifted up to the forward traveling third speed, the change of shifter state is performed immediately after timing X where controller 94 issues the gearshift command signal. This means that timing Y for starting the clutch switching delays after the issuance of the gearshift command signal. More specifically, with regard to the above-mentioned four gearshift processes including the shift up process shown in FIG. 12, the period from the issuance of the gearshift command signal till the completion of the gearshift is clutch switching time 205 plus the time lag between timings X and Y. On the other hand, none of the other shift up and shift down processes needs the change of shifter state. Thus, the clutch switching starts immediately after controller 84 issues the gearshift command signal, so that it takes only clutch switching time 205 to complete the gearshift. In other words, the time for the gearshift maintaining the shifter state is shorter than the time for the gearshift requiring change of the shifter state by the time lag between timings X and Y required for moving the shifter or shifters.

With regard to each gearshift, regardless of whether the shifter needs (the shifters need) to be moved or not, one of the forward traveling low speed shifter states, the forward traveling middle speed shifter state, and the forward traveling high speed shifter state is established before start of the clutch switching. In each of the three shifter states, both of one forward-traveling odd-numbered speed drive train and one forward-traveling even-numbered speed drive train are selected to be activated, both of the odd number and even number neighboring each other. Therefore, in any shifter state, the selected forward-traveling odd-numbered speed drive train is activated by engaging first clutch C1 and disengaging second clutch C2, and the selected forward-traveling even-numbered speed drive train is activated by disengaging first clutch C1 and engaging second clutch C2. If the shift up and shift down between one forward-traveling odd-numbered speed and one forward-traveling even-numbered (next number to the odd-number) speed are repeated, each of the shift up and shift down processes is performed by only the clutch switching without movement of the shifter or shifters. Consequently, these shifts up and shifts down are accelerated. The later-discussed forward/backward traveling direction switching in the reverse mode is an adaptation of this gearshift pattern between neighboring one forward traveling odd-numbered speed and one forward traveling even-numbered speed.

Figure 13:
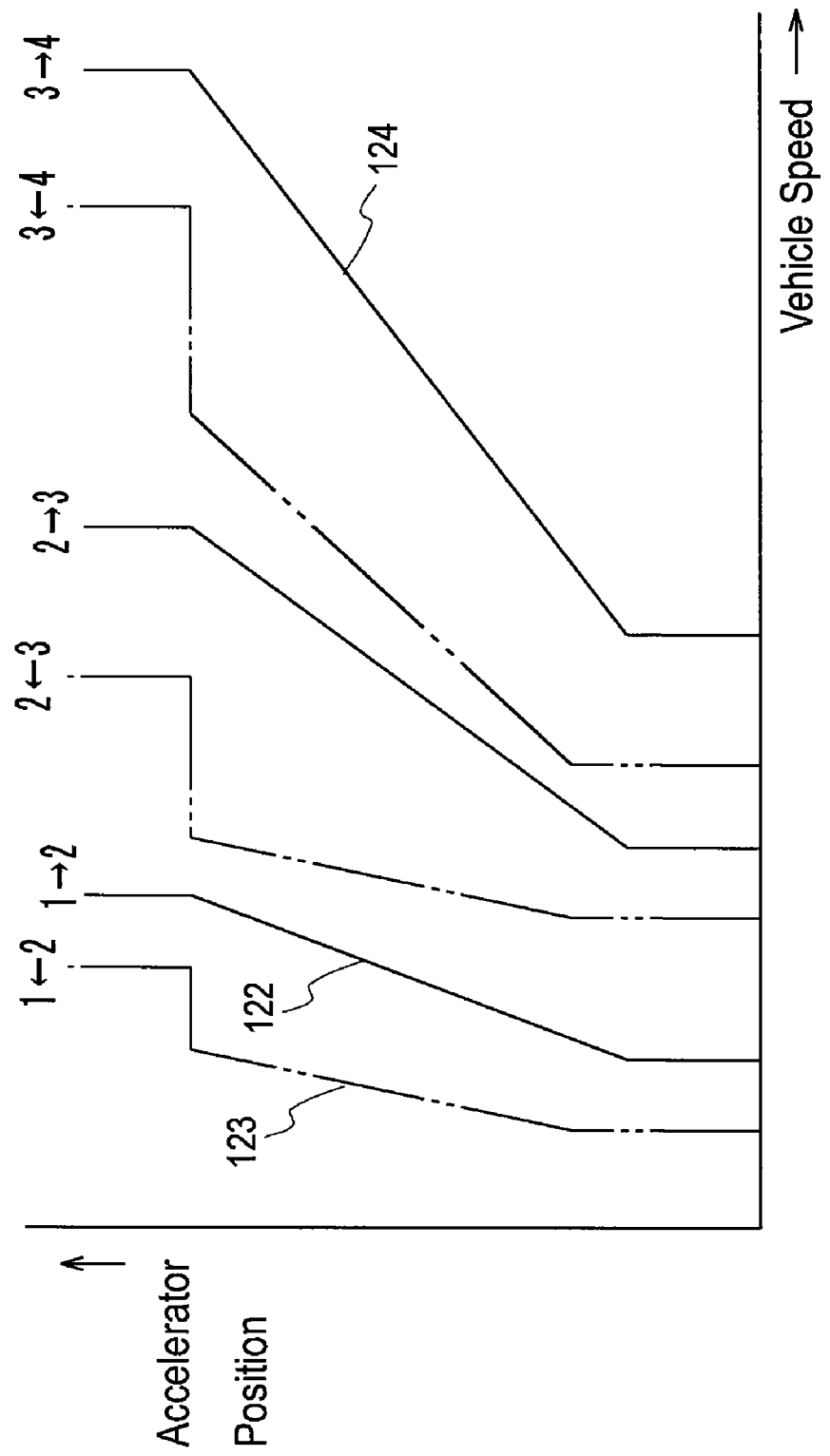
FIG. 13 is a graph of characteristic lines indicating respective gearshift points in correspondence to variation of accelerator position in relation to vehicle speed.

The timings (e.g., timing X in the gearshift shown in FIG. 12), when controller 94 issues the gearshift command signal for shift up or shift down, are programmed as gearshift point characteristic lines shown in FIG. 13 to correspond to the relation of the accelerator position (such as depression of the accelerator pedal or the opening degree of the engine throttle) and to the vehicle speed (the actual traveling speed of working vehicle 1). As understood from comparison between the illustrated gearshift point characteristic lines, for example, between a gearshift point characteristic line 122 for shift up from the forward traveling first speed to the forward traveling second speed and a gearshift point characteristic line 123 for shift down from the forward traveling second speed to the forward traveling first speed, with respect to the gearshift between one speed and another next speed, the vehicle speed corresponding to the accelerator position for issuing the gearshift command signal for shift down from the other speed to the one speed is less than that for issuing the gearshift command signal for shift up from the one speed to the other speed, thereby achieving a hysteresis gearshift control for avoiding excessively sensitive repeat of shift up and shift down. Further, understood from gearshift point characteristic line 122 for shift up from the forward traveling first speed to the forward traveling second speed and a gearshift point characteristic line 124 for shift up from the forward traveling third speed to the forward traveling fourth speed, due to the settings of deceleration ratios, the vehicle speed range corresponding to the accelerator position for issuing the gearshift command signal for gearshift between low speeds is narrower than that for issuing the gearshift command signal for gearshift between high speeds.

Incidentally, as mentioned above, the forward traveling first speed drive train includes the first deceleration gear train (gears 72 and 96), the adjusting gear train (gears 77 and 73), the second deceleration gear train (gears 14b and 16a), and the third deceleration gear train (gears 16b and 81). The forward traveling forth speed drive train includes the adjusting gear train (gears 77 and 73) and the third deceleration gear train (gears 16b and 81). The forward traveling fourth speed is frequently used, and the frequency of using the forward-traveling first speed is not high. The adjusting gear train is shared between the forward traveling first speed drive train and the forward traveling fourth speed drive train, thereby reducing the number of components, simplifying the transmission structure, minimizing the space for arranging gears, enhancing the flexibility in layout of components in DC transmission 2, and thereby minimizing and economizing working vehicle 1.

For backward traveling of vehicle 1, speed change operation lever 95 is set at a backward traveling position 117R. Accordingly, controller 94 issues a gearshift command signal to set second shifter 98a to position C for rotatably integrally engaging reversing gear 78 with speed change shaft 15, and to set third shifter 99a to position N for relatively rotatably disengaging deceleration gear 16 from speed change shaft 15. Since second clutch C2 is disengaged during the backward traveling, first shifter 97a may be disposed at either position A for rotatably integrally engaging deceleration gear 14 with second clutch output shaft 13 or position N for relatively rotatably disengaging deceleration gear 14 from second clutch output shaft 13.

This state, where second shifter 98a is set at position C and third shifter 99a is set at position N regardless of the position of first shifter 97a, is referred to as a backward traveling shifter state. In the backward traveling shifter state, a backward traveling speed drive train is selected to be activated. In this regard, the backward traveling speed drive train is defined as the series connection of first clutch output shaft 12; the first deceleration gear train; speed change shaft 15; the reversing gear train including gears 78, 75 and 14a; the second deceleration gear train; and the third deceleration gear train. In the backward traveling shifter state, when first clutch C1 is engaged and second clutch C2 is disengaged, the backward traveling speed drive train is activated. In this state, the rotary force of input shaft 11 is transmitted to transmission output shaft 11 through engaged first clutch C1 and the backward traveling speed drive train, so as to be outputted as a backward traveling output of DC transmission 2 to front and rear axles 4 and 7.

Incidentally, speed change operation lever 95, having been set at automatic forward traveling gearshift position 117D, for example, is necessarily passed through neutral position N before reaching backward traveling position 117R. Thus, on the moment that speed change operation lever 95 is shifted to backward traveling position 117R, the neutral state where both clutches C1 and C2 are disengaged is initially kept. In this initial neutral state, shifter control mechanism 143 is controlled to set the backward traveling shifter state, and then first clutch C1 is engaged.

When speed change operation lever 95 is set at a forward traveling low speed position 117L, DC transmission 2 is set and kept at the forward traveling lowest speed, i.e., the forward traveling first speed. Both clutches C1 and C2 are disengaged in reaction to movement of speed change operation lever 95, and when speed change operation lever 95 reaches forward traveling low speed position 117L, shifter control mechanism 143 is controlled to set shifters 97a, 98a and 99a at respective positions A, B and N. Then, first clutch C1 is engaged so as to activate the forward traveling first speed drive train, i.e., to establish the forward traveling first speed of DC transmission 2. While speed change operation lever 95 is set at neutral position 117N, both clutches C1 and C2 are kept disengaged. When speed change operation lever 95 is set at a parking position 117P, controller 94 issues a parking brake command signal to a parking brake (not shown) so as to brake at least either front axles 4 or rear axles 7.

The manual forward traveling gearshift mode in the normal traveling mode will be described with reference to FIGS. 10, 11(a) and 12. The manual forward traveling gearshift mode where an operator can optionally set any forward traveling speed is established by arranging speed change operation lever 95 into longitudinal slot 116. Every time speed change operation lever 95 is pressed against one (a front) end edge of longitudinal slot 116 defined as a shift up position 116U, controller 94 transmits a gearshift command signal for shift up by one speed to valves 91, 92, 103, 104, 105 and 106 so as to shift up the forward traveling speed from the first speed to the fourth speed one by one. Every time speed change operation lever 95 is pressed against the other (a rear) end edge of longitudinal slot 116 defined as a shift down position 116D, controller 94 transmits a gearshift command signal for shift down by one speed to valves 91, 92, 103, 104, 105 and 106 so as to shift down the forward traveling speed from the fourth speed to the first speed one by one. Due to which forward traveling speed is presented and due to whether the speed is shift up or down, clutches C1 and C2 and shifters 97a, 98a and 99a are controlled similar to those in the automatic forward traveling gearshift mode.

A power train structure of DC transmission 2 in the reverse mode will be described with reference to FIGS. 2, 10, 11(b) and so on. The reverse mode is defined as a mode where the switching between the predetermined forward traveling speed and the backward traveling speed is rapidly performed due to the switching of speed change operation lever 95 along longitudinal slot 118, between a forward traveling position 118F and a backward traveling position 118R. To set the reverse mode, shifters 97a, 98a and 99a are set and held at respective positions A, C and N as shown in FIG. 11(b). In other word, while there are two types of backward traveling shifter states due to the difference of first shifter 97a as mentioned above, the backward traveling shifter state setting shifter 97a at position A is selected for the reverse mode. This shifter state is referred to as a reverse mode shifter state.

In this reverse mode shifter state, the backward traveling speed drive train is selected to be activated as mentioned above, and simultaneously, the forward traveling second speed drive train is selected to be activated. Therefore, in the reverse mode shifter state, when first clutch C1 is engaged and second clutch C2 is disengaged, the backward traveling speed drive train is activated and the forward traveling second speed drive train is idled. On the other hand, in the reverse mode shifter state, when first clutch C1 is disengaged and second clutch C2 is engaged, the forward traveling second speed drive train is activated and the backward traveling speed drive train is idled. The control system is configured so that the setting of speed control operation lever 95 to forward traveling position 118F causes the engagement of first clutch C1 and disengagement of second clutch C2, and the setting of speed control operation lever 95 to backward traveling position 118R causes the disengagement of first clutch C1 and engagement of second clutch C2. Therefore, the switching of DC transmission 2 between the forward traveling second speed and the backward traveling speed is swiftly performed by only the alternate engagement/disengagement switching between first and second clutches C1 and C2 while keeping the shifter state, i.e., without movement of shifters 97a, 98a and 99a. In this way, during setting of the reverse mode, the time from the issuance of gearshift command signal from controller 94 till the completion of gearshift is short because, referring to FIG. 12, the time is equal to only clutch switching time 205 and does not include the time lag between timings X and Y for moving the shifter or shifters. Further, in the reverse mode, the switching of the forward/backward traveling direction is performed frequently, however, moderately due to the cross wave control.

Incidentally, DC transmission 2 shown in FIGS. 2, 4 and others is configured so that the backward traveling speed drive train is activated by engaging first clutch C1, thereby enabling setting of the reverse mode shifter state where the backward traveling speed drive train is selected to be activated simultaneously with the forward traveling second speed drive train which is activated by engaging second clutch C2.

Alternatively, if a dual clutch transmission is configured so that a backward traveling speed drive train is activated by engaging second clutch C2 to be engaged for forward-traveling even-numbered speeds, the predetermined one forward traveling speed set by the reverse mode should be one forward traveling odd-numbered speed, e.g., a forward traveling first speed as the lowest forward-traveling odd-numbered speed.

As mentioned above, in the reverse mode, the alternate engagement and disengagement of first and second clutches C1 and C2 for gearshift of forward traveling speed is utilized for switching the forward/backward traveling direction. Therefore, no additional clutch is provided for the forward/backward traveling direction, thereby reducing the number of components and costs and improving maintenancability.

A hydraulic circuit structure of working vehicle 1 will now be described with reference to FIGS. 2 to 8 and 14, mainly describing the lubricating fluid circulation in transaxle casing 38 incorporating DC transmission 2. As shown in FIG. 5, a seal casing 67 incorporating a trochoidal gear pump type hydraulic pump 145 is fixed onto an outer (left) side surface of an upper portion of left casing 68 of transaxle casing 38. In transaxle casing 38, a first transmission chamber 177 is formed between left casing 68 and a support wall 69a formed of central casing 69. A pump shaft 145a of hydraulic pump 145 is journalled by a wall portion 68b of left casing 68 through bearings, and is extended at an end thereof outward from wall portion 68b into first transmission chamber 177 so as to be fixedly provided thereon with a pump gear 146. Pump gear 146 meshes with a gear 147 fixed on an intermediate portion of input shaft 11, so that hydraulic pump 145 is driven by input shaft 11 receiving power from engine 9.

The diameter of gear 147 is smaller than that of pump gear 146, and the number of teeth of gear 147 is less than that of pump gear 146, so that the rotary speed of pump shaft 145a becomes slower than that of input shaft 11. Therefore, a normal slow-rotation type hydraulic pump which is lower-priced than a special fast-rotation type hydraulic pump can be adopted as hydraulic pump 145, thereby economizing transaxle 8.

As shown in FIG. 8, an inlet port of hydraulic pump 145 is opened through a fluid passage 149 and a filter 148 to a fluid sump 136 provided in first transmission chamber 177 or in another portion in transaxle casing 38 so that hydraulic pump 145 is supplied with fluid from fluid sump 136. An outlet port of hydraulic pump 145 is opened to a fluid passage 150. A distribution unit 151 bifurcates fluid passage 150 into a fluid passage 152 for an external working device and a fluid passage 153 for a power steering system and the gearshift of DC transmission 2. In distribution unit 151, fluid passages 152 and 153 are provided with respective throttles (e.g., orifices) 151a and 151b for regulating pressure. Fluid passage 152 is connected to a changeover valve 154, and changeover valve 154 is connected to a hydraulic lifting cylinder 156 through a piping 155. Due to control of changeover valve 154 supplied with fluid from hydraulic pump 145, a hydraulic lifting cylinder 156 is controlled so as to control vertical rotation of lifting arms 157 for lifting the external working device. On the other hand, a power steering hydraulic valve device 158 is fluidly connected to an intermediate portion of fluid passage 153 so as to extract fluid for supplying a power steering cylinder 159 from fluid passage 153. In this way, power steering hydraulic valve device 158 is supplied with fluid from hydraulic pump 145, and is controlled by manipulating a steering operation device, such as a steering wheel, so as to control power steering cylinder 159 for turning front wheels 3.

Due to the above construction, hydraulic pump 145 attached on transaxle casing 38 serves as a single hydraulic pressure source which can supply pressurized fluid to not only DC transmission 2 but also the external working device, the power steering system or the like, thereby reducing the number and cost of hydraulic pumps needed for the supply of pressurized fluid to the respective hydraulic devices, simplifying the fluid passage structure, minimizing rear transaxle 8, enhancing the flexibility of layout of components in vehicle 1, and minimizing and economizing vehicle 1.

Figure 14:
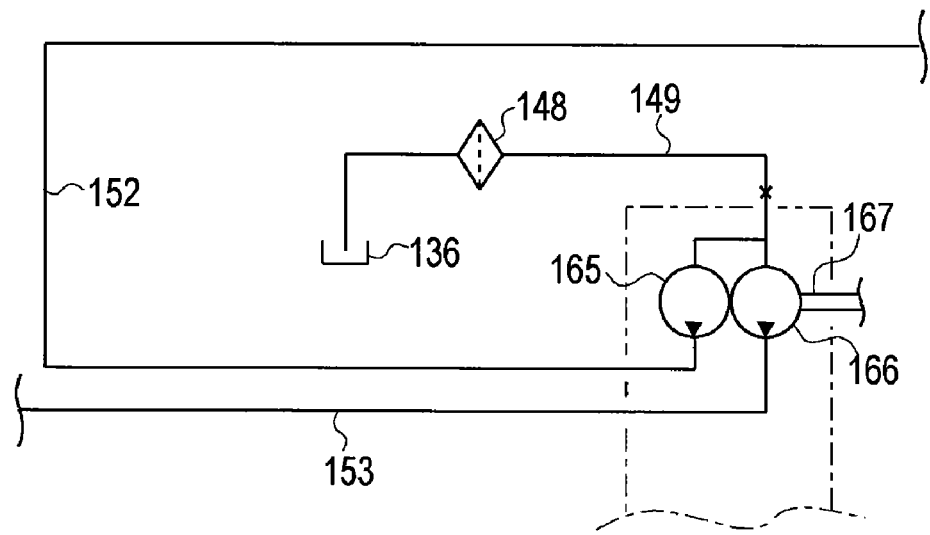
FIG. 14 is a partial view of a hydraulic circuit illustrating a construction of the hydraulic pump according to another embodiment.

In an alternative embodiment shown in FIG. 14, a rear transaxle 8 is provided with a pair of hydraulic pumps 165 and 166 having a common pump shaft 167, instead of single hydraulic pump 145. Distribution unit 151, and delivery ports of respective hydraulic pumps 165 and 166 are connected to respective fluid passages 152 and 153, so that one of hydraulic pumps 165 and 166 supplies fluid to an external working device, and the other supplies fluid to DC transmission 2 and the power steering system. Each of hydraulic pumps 165 and 166 may be small in displacement and inexpensive while supplying sufficient fluid to these hydraulic devices. Both hydraulic pumps 165 and 166 are provided on or in transaxle casing 38 and no additional external hydraulic pump for the external hydraulic device is provided outside of transaxle casing 38, thereby compacting working vehicle 1.

As shown in FIG. 8, fluid passage 153 is connected to the power steering system including power steering hydraulic valve device 158 and power steering cylinder 159, and is further extended and bifurcated between a fluid passage 160 for controlling dual clutch unit 82 and fluid passage 114 for controlling hydraulic cylinders 100, 101 and 102. As mentioned above, fluid passage 114 is connected to solenoid changeover valves 103, 104, 105 and 106 for controlling hydraulic cylinders 100, 101 and 102 so as to control positions of shifters 97a, 98a and 99a. On the other hand, the fluid passage 160 is further bifurcated into fluid passages 161 and 162. Fluid passage 161 is passed through a check valve 168 and a filter 169 and is further bifurcated into two passages connected to respective pump ports of respective solenoid proportional deceleration valves 91 and 92. Outlet ports of solenoid proportional deceleration valves 91 and 92 are connected to respective fluid passages 88 and 89. In this way, hydraulic pump 145 is adapted to supply pressurized fluid as clutch pressure fluid to cylinder chamber 83 of first clutch C1 and cylinder chamber 84 of second clutch C2.

Fluid passage 162 is passed through a pressure regulation valve 170 and is bifurcated between fluid passages 163 and 164. Fluid passage 163 is connected to changeover valve 93 controlling the supply and discharge of lubricant oil to and from first and second clutches C1 and C2. Pilot fluid passages 93a and 93b of changeover valve 93 are fluidly connected to fluid passages 88 and 89, respectively. When pressurized fluid flows through either fluid passage 88 or 89 during the operation of first or second clutch C1 or C2, this fluid flow supplies pilot pressure fluid to either pilot fluid passage 93a or 93b so that changeover valve 93 is shifted to connect its pump port and outlet port to each other. Accordingly, the pressurized fluid in fluid passage 163, regulated in pressure by pressure regulation valve 171, is supplied as lubricant fluid from changeover valve 93 to first and second clutches C1 and C2 through fluid passage 90.

As shown in FIG. 5, a fluid passage 172 is bored in seal casing 67 in parallel to input shaft 11, and fluid passage 164 is connected to fluid passage 172. Further, in seal casing 67, fluid passage 173 is branched off from an intermediate portion of fluid passage 172, a bearing unit 179 including a bearing 180, and a fluid seal 181 is configured so as to support a left end of input shaft 11. Also, fluid passage 173 is opened to bearing unit 179, so that hydraulic pump 145 forcibly supplies pressurized fluid as lubricant fluid to bearing unit 179.

As shown in FIG. 5, seal casing 67 integrally incorporates lubricant fluid passage 173 and bearing unit 179 for supporting input shaft 11, and is further formed integrally with a pump casing portion 67*a* into which hydraulic pump 145 is assembled. Therefore, lubricant fluid passage 173, bearing unit 179 and pump casing portion 67*a* are collected in seal casing 67 so as to require no additional relevant piping, bearing, or pump casing, thereby reducing the number of components and costs, and minimizing transaxle casing 38.

Further, as shown in FIG. 4, in transaxle casing 38, left casing 68 is formed integrally with an outer wall portion 68*b* penetrated by a fluid passage 68*c*, and is formed integrally with a bearing wall portion 182 supporting a left end of speed change shaft 15 through a bearing. A fluid chamber 175 is provided between outer wall portion 68*b* and bearing wall portion 182. Fluid passage 172 is opened to fluid chamber 175 through fluid passage 68*c*. A vertical fluid passage 176 is bored in outer wall portion 68*b* and is opened at a bottom end thereof to fluid chamber 175. Fluid passage 176 is formed at an upper portion thereof with a delivery port 176*a* opened to dual clutch unit 82 in first transmission chamber 177. In this way, the pressurized fluid from hydraulic pump 145 is forcibly sprayed out as lubricant fluid from delivery port 176*a* to dual clutch unit 82 through fluid passages 172 and 68*c*, fluid chamber 175 and fluid passage 176.

Speed change shaft 15 is penetrated on the central axis thereof by an axial fluid passage 174. Axial fluid passage 174 is opened at a left end thereof to fluid chamber 175. Right casing 70 is formed integrally with an outer wall portion 70*a*. Further, right casing 70 is formed integrally with a bearing wall portion 183 journaling a right end of speed change shaft 15 through a bearing 187, and is formed integrally with a bearing wall portion 185 journaling a right end of second clutch output shaft 13 through a bearing 186. A bearing cover 188 is bridged between bearings 186 and 187. A vertical groove 70*b* is formed on an inside surface of outer wall portion 70*a* and is covered with bearing cover 188 so as to form a fluid passage 184. Axial fluid passage 174 is opened at a right end thereof to fluid passage 184. A second transmission chamber 178 is formed in transaxle casing 38 between support wall 69*a* of central casing 69 and outer wall portion 70*a* of right casing 70 so as to incorporate the speed gears and shifters of DC transmission 2, and fluid passage 184 is provided at an upper portion thereof with a delivery port 184*a* opened to second transmission chamber 178. Therefore, the pressurized fluid from hydraulic pump 145 is forcibly sprayed out as lubricant fluid from delivery port 184*a* to the speed gears and so on in second transmission chamber 178 through fluid passages 172 and 68*c*, fluid chamber 175, axial fluid passage 174 in speed change shaft 15, and fluid passage 184.

Further, an axial fluid passage 189 is bored in second clutch output shaft 13. A right end of axial fluid passage 189 is opened on the right end of second clutch shaft 13 outward to fluid passage 184. A left end of axial fluid passage 189 is closed in an axial intermediate portion of second clutch output shaft 13, however, radial fluid holes 189*a* are extended in second clutch output shaft 13 from the closed left end of axial fluid passage 189 and are opened on the outer peripheral surface of second clutch output shaft 13 to the inner peripheral surface of deceleration gear 14 on second clutch output shaft 13. Similarly, radial fluid holes 174*a*, 174*b* and 174*c* are extended in speed change shaft 15 from axially intermediate portions of axial fluid passage 174, and are opened on the outer peripheral surface of speed change shaft 15 to inner peripheral surfaces of respective gears 16, 78 and 77 on speed change shaft 15.

In this way, the pressurized fluid from hydraulic pump 145 is sprayed out from the openings of radial fluid holes 174*a*, 174*b*, 174*c* and 189*a* along with rotation of second clutch output shaft 13 and speed change shaft 15 so as to lubricate gears 14, 16, 77 and 78, spline hubs 97, 98 and 99 with synchromeshes 97*b*, 98*b* and 99*b*, bearings 186 and 187 and so on, which are provided on second clutch output shaft 13 and speed change shaft 15.

In this way, DC transmission 2 is provided with a lubricant fluid circuit 190, which is formed in transaxle casing 38, which includes fluid chamber 175 and fluid passage 176 formed in left casing 68, fluid passage 184 formed in right casing 70, axial fluid passage 174 and radial fluid holes 174*a*, 174*b* and 174*c* formed in speed change shaft 15, and axial fluid passage 189 and radial fluid hole 189*a* formed in second clutch output shaft 13. Lubricant fluid circuit 190 surely delivers the pressurized fluid from hydraulic pump 145 as lubricant fluid to the components of DC transmission 2, e.g., dual clutch unit 82, the speed gear trains, the synchromeshes and the bearings.

Due to the configuration of lubricant fluid circuit 190 in transaxle casing 38, speed change shaft 15 and second clutch output shaft 13, single hydraulic pump 145 can supply sufficient lubricant fluid to DC transmission 2, so as to require no additional hydraulic pump or piping for supplying lubricant fluid, thereby economizing, minimizing and simplifying rear transaxle 8.

Figure 3:
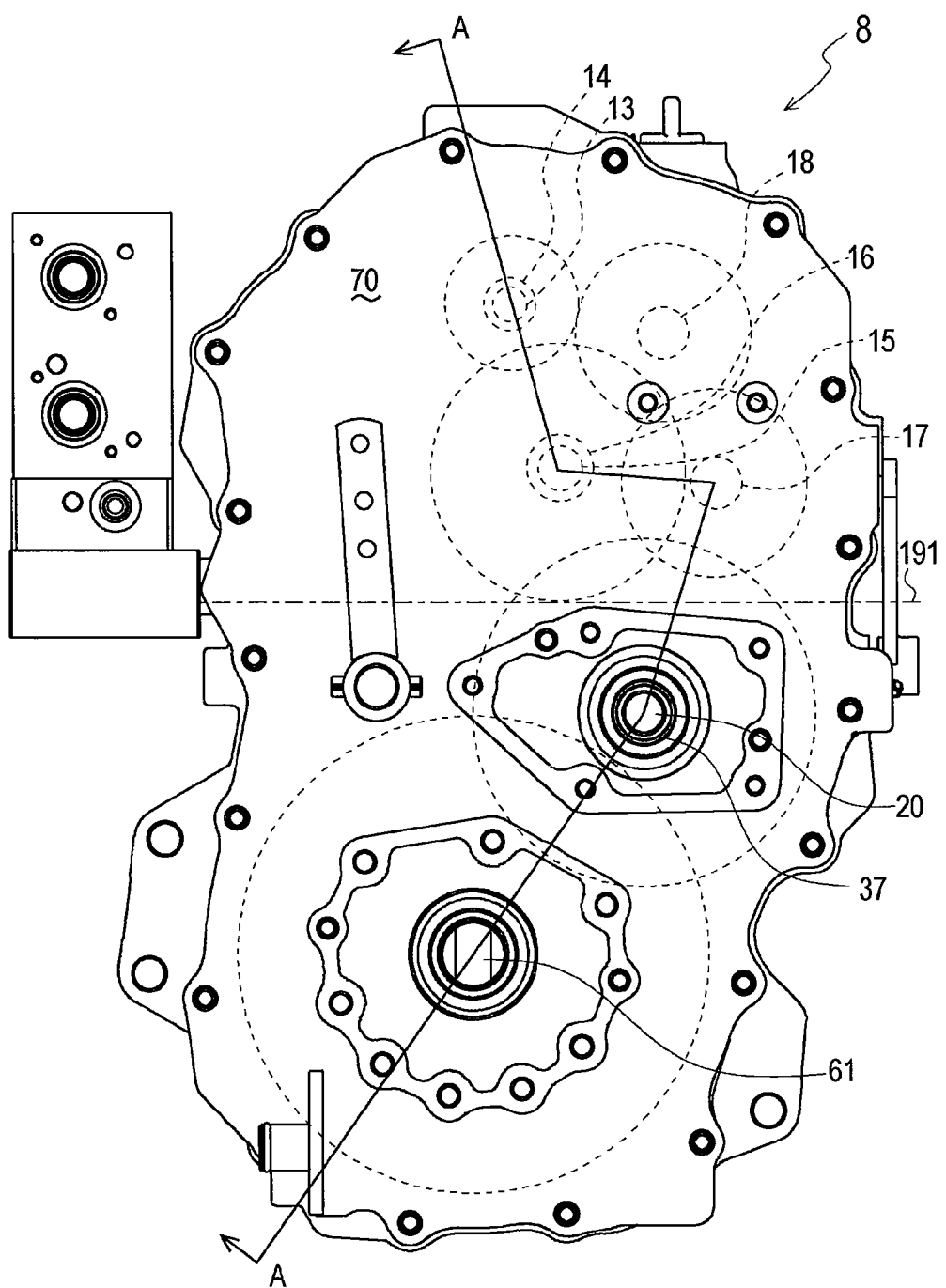
FIG. 3 is a side view of the rear transaxle.

According to rotation of input shaft 11, speed change shaft 15 and second clutch shaft 13, the lubricant fluid delivered by hydraulic pump 145 through lubricant fluid passage 190 is sprayed and dropped so as to lubricate the members of DC transmission 2 such as dual clutch unit 82, the speed gears and synchromeshes, and then is recovered into fluid sump 136. As shown in FIGS. 3 and 4, fluid sump 136 has a fluid surface level 191 which is lower than transmission output shaft 17 so as to prevent the components of DC transmission 2, e.g., dual clutch unit 82, speed change shaft 15, second clutch output shaft 13, the speed gears and synchromeshes 97*b*, 98*b* and 99*b*, from being submerged in fluid sump 136, thereby avoiding excessive agitation of the fluid of fluid sump 136 causing the temperature rise of fluid. This is very advantageous for reducing the fluid agitation resistance causing the reduction of power transmission efficiency and the temperature rise of fluid, in consideration that dual clutch unit 82 and synchromeshes 97*b*, 98*b* and 99*b* cause great fluid agitation resistance.

Control of DC transmission 2 for starting or traveling of working vehicle 1 on an upward slope will now be described with reference to FIGS. 2, 8, 9, 12 and 18 to 21.

Figure 18:
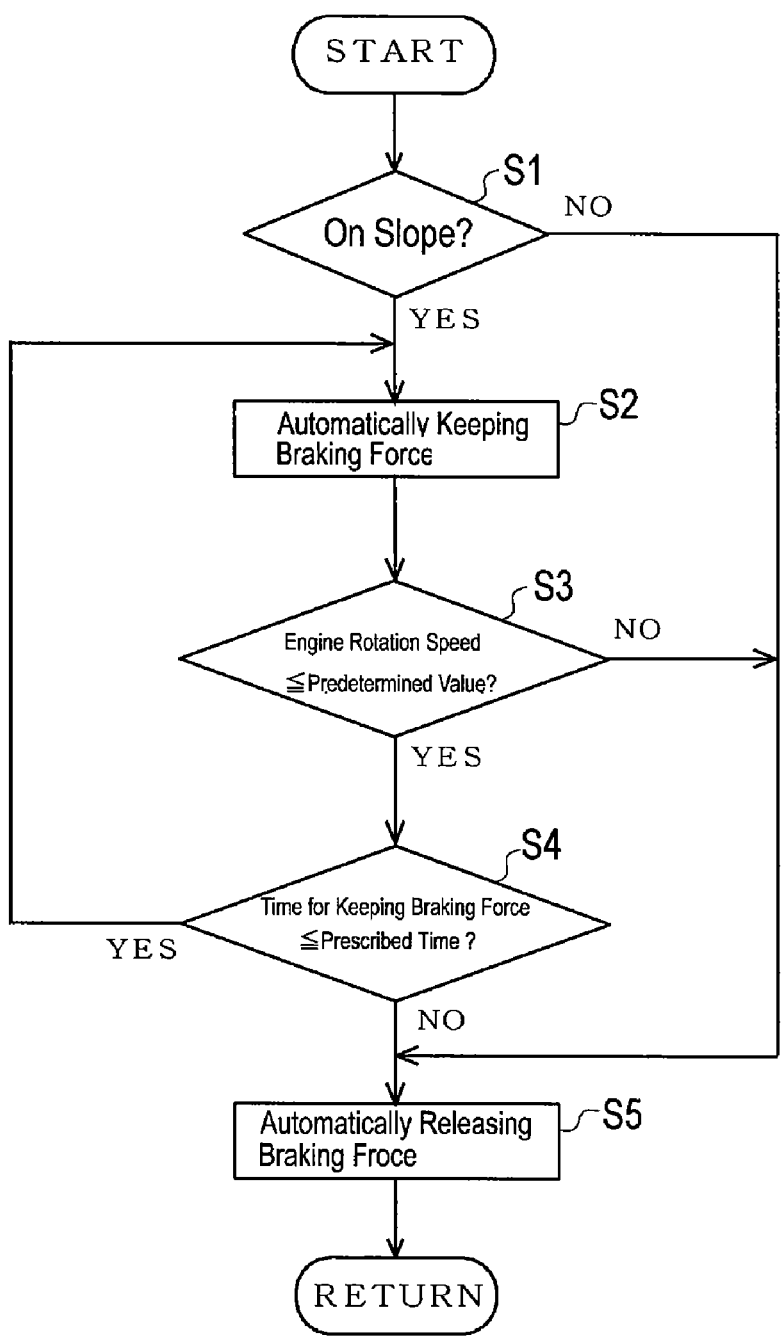
FIG. 18 is a flow diagram showing a procedure of a brake assisting control.

A brake assisting control for starting uphill traveling will be described with reference to FIGS. 2, 9 and 18. The brake assisting control is defined as a control for assisting the uphill starting of working vehicle 1 by automatic control of the braking force of a brake device 195 based on the engine rotary speed or the like when a depressed brake pedal 196 is released in working vehicle 1 on an upward slope.

As shown in FIG. 9, a brake pedal position sensor 197, an engine rotary speed sensor 192 and a vehicle inclination angle sensor 193 are connected to controller 94. Brake pedal position sensor 197 detects the depressed position of brake pedal 196. Engine rotary speed sensor 192 is provided on input shaft 11 of DC transmission 2 or the like so as to detect the output rotary speed of engine 9. An acceleration sensor or the like may be vehicle inclination angle sensor 193 so as to decide whether stationary working vehicle 1 is placed on an upward slope or not. Controller 94 receives a pedal position signal from brake pedal position sensor 197, an engine rotary speed signal from engine rotary speed sensor 192 and a vehicle inclination angle signal from vehicle inclination angle sensor 193.

Hydraulic brake device 195 is provided on an intermediate portion of the power train from engine 9 to front and rear wheels 3 and 6, and is controlled by a solenoid changeover valve 194 connected to controller 94 as shown in FIG. 9. Based on the pedal position signal, engine rotary speed signal, and the vehicle inclination angle signal, controller 94 issues a brake control signal to valve 194 so as to keep or release the brake force of brake device 195.

Due to this construction, in working vehicle 1 staying on an upward slope, when an operation for starting the uphill traveling of vehicle 1 is performed, e.g., when a key switch is turned on or when depressed brake pedal 196 is released, controller 94 receives an engine start signal from an engine control circuit or a pedal position signal from pedal position sensor 197, and recognizes that the operation for starting the uphill traveling has been performed.

Then, controller 94 commands vehicle inclination angle sensor 193 to detect the vehicle inclination angle, and receives the vehicle inclination angle signal from vehicle inclination angle sensor 192. Accordingly, controller 94 decides whether the road on which working vehicle 1 stays is upwardly sloped or not (Step S1). When controller 94 decides that working vehicle 1 is not upwardly sloped (Step S1, NO), controller 94 transmits a brake command signal for releasing the braking force to solenoid changeover valve 194. Accordingly, valve 194 is switched to control the supply of hydraulic fluid to braking device 195 so as to release the braking force applied by brake device 195 (Step S5). When controller 94 decides that the working vehicle 1 stays on an upward slope (Step S1, YES), controller 94 transmits a brake command signal for keeping the braking force to solenoid changeover valve 194, so that valve 194 is controlled to control the supply of hydraulic oil to brake device 195 so as to keep the braking force applied by brake device 195 (Step S2).

While the braking force is kept, controller 94 detects the engine rotary speed based on the engine rotary speed signal transmitted from engine rotary speed sensor 192, and decides whether the detected engine rotary speed is less than a predetermined value or not (Step S3). When the engine rotary speed exceeds the predetermined value (Step S3, NO), controller 94 transmits the brake command signal for releasing the braking force to solenoid changeover valve 194, thereby automatically releasing the braking force applied by brake device 195 (Step S5).

Even through the engine rotary speed is less than the predetermined value (Step S3, YES), if the time for keeping the braking force goes beyond a prescribed time (Step S4, NO), controller 94 transmits the brake control signal for releasing the braking force to solenoid changeover valve 194, thereby automatically releasing the braking force applied by brake device 195 (Step S5). When the engine rotary speed is less than the predetermined value (Step S3, YES), and the time for keeping the braking force does not go beyond the prescribed time (Step S4, YES), the braking force is automatically kept (Step S2). The brake assisting control is performed by repeating the above-described processes.

Incidentally, the prescribed time is defined as a time lag required for an operator from the release of brake pedal 196 until activation of an accelerator such as depression of an accelerator pedal. Normally, the prescribed time is about one second. Alternatively, the prescribed time may be a different value or variable so as to correspond to various conditions about the skill of an operator, environments for traveling of working vehicle 1 and the like.

Due to the brake assisting control, the braking force applied by brake device 195 is automatically kept until the increased engine rotary speed reaches the prescribed value (Step S3, NO), or until the prescribed time for keeping the braking force power has passed (Step S4, NO).

Since the timing for release of the braking force is determined based on detection of the engine rotary speed and the predetermined time passage for keeping the braking force, the start of uphill traveling of working vehicle 1 can be delayed after the engine rotary speed has increased to an enough value corresponding to engine load, thereby preventing the failures such as the engine stop and the decrease in power transmission efficiency. Further, even if the engine rotary speed is not enough, the braking power is automatically released after it has held for the prescribed time, so that working vehicle 1 can be optionally driven backward to descend the slope freely from the braking force.

Referring to FIGS. 2, 9, 12 and 19, description will be given of a time control of the clutch switching, i.e., the alternate engagement and disengagement shift between first and second clutches C1 and C2, corresponding to uphill traveling of working vehicle 1 and load on working vehicle 1 during traveling. As shown in FIG. 9, controller 94 is connected to vehicle inclination angle sensor 193 as mentioned above, and is connected to a torque sensor 198, a first clutch pressure sensor 199 and a second clutch pressure sensor 200. Torque sensor 198 is provide on input shaft 11 or the like so as to detect a load torque applied on front and rear wheels 3, 6 during traveling. First clutch pressure sensor 199 detects the clutch pressure of first clutch C1. Second clutch pressure sensor 200 detects the clutch pressure of second clutch C2. A load torque signal, indicating the degree of the load torque applied on front and rear wheels 3, 6, is transmitted from torque sensor 198 to controller 94. Clutch pressure signals indicating clutch pressures of respective clutch C1 and C2 are transmitted from respective clutch pressure sensors 199 and 200 to controller 94.

Further, as described above, solenoid proportional reducing valve 91 for controlling first clutch C1 is connected to controller 94, and solenoid proportional reducing valve 92 for controlling second clutch C2 is connected to controller 94. Controller 94 transmits a predetermined clutch control signal to solenoid proportional reducing valves 91 and 92 based on the vehicle inclination angle signal and the load torque signal, thereby increasing or decreasing the clutch pressures of clutches C1 and C2.

The above-mentioned cross wave control is adapted to control the clutch pressures of clutches C1 and C2. Cross wave control maps for respective shift up and shift down processes are programmed in controller 94. With regard to the respective cross wave control map shown in FIG. 12 (for shift up from the forward traveling second speed to the forward traveling third speed), the clutch pressure graphs of clutches C1 and C2 crossing at equal pressure point 201 for clutch switching time 205 are defined as a cross wave pattern. According to the detection of the inclination angle of working vehicle 1 by vehicle inclination angle sensor 193 and the detection of load torque applied on wheels 3 and 6 of working vehicle 1 during traveling, this cross wave pattern is variable so as to change clutch switching time 205 and move equal pressure point 201.

This change of cross wave pattern will be described with reference to a flow chart of FIG. 19. Based on the vehicle inclination angle signal from vehicle inclination angle sensor 193, controller 94 decides whether the inclination angle of working vehicle 1 is less than a threshold value or not (Step S6). When the inclination angle is less than the threshold value (Step S6, YES), based on the load torque signal from torque sensor 198, controller 94 decides whether the detected load torque is less than a threshold value or not (Step S7). When the detected load torque is less than the threshold value (Step S7, YES), a normal cross wave pattern 204 having a normal clutch switching time 205*c* and a normal equal pressure point 201*c* is adapted for controlling the clutch pressures of clutches C1 and C2 for gearshift.

When the detected inclination angle of working vehicle 1 is not less than the threshold value (Step S6, NO), controller 94 uses another cross wave pattern 202 having a clutch switching time 205*a* shorter than normal clutch switching time 205*c* and an equal pressure point 201*a* earlier than normal equal pressure point 201*c*. That is, the clutch switching for gearshift of DC transmission 2 is accelerated so as to prevent the output power of DC transmission 2 for driving wheels 3 and 6 from being reduced to a value insufficient to climb the slope.

When the inclination angle of working vehicle 1 is less than the threshold value (Step S6, YES) and the load torque is not less than the threshold value (Step S7, NO), controller 94 uses another cross wave pattern 203 having a clutch switching time 205*b* shorter than normal clutch switching time 205*c* and an equal pressure point 201*b* earlier than normal equal pressure point 201*c*. That is, the clutch switching for gearshift of DC transmission 2 is accelerated so as to prevent the output power of DC transmission 2 for driving wheels 3 and 6 from being reduced to a value insufficient to overcome the load torque.

Figure 19:
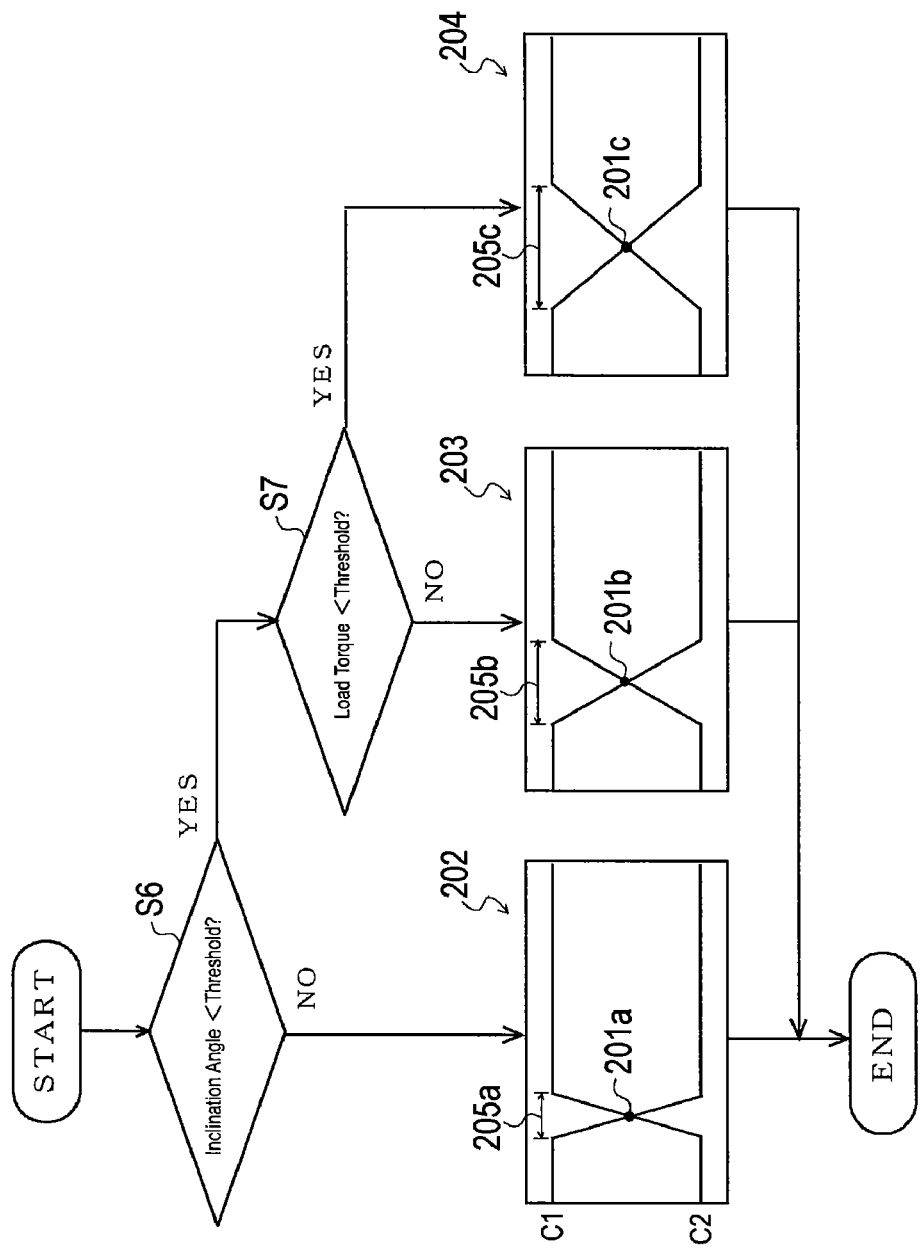
FIG. 19 is a flow diagram showing a procedure of a switching point control.

Incidentally, in FIG. 19, cross wave pattern 202 corresponding to the uphill traveling has clutch switching time 205*a* shorter than clutch switching time 205*b* of cross wave pattern 203 corresponding to the load torque, and has equal pressure point 201*a* earlier than equal pressure point 201*b*, in consideration that the rapid gearshift for preventing working vehicle 1 from slipping down on a slope is normally more emergent than that for overcoming the overload during traveling of vehicle 1. However, cross wave pattern 202 may be similar to cross wave pattern 203 so as to have the same clutch switching time 205*a* as clutch switching time 205*b* and the same equal pressure point 201*a* as equal pressure point 201*b*, or may have clutch switching time 205*a* longer than clutch switching time 205*b* and have equal pressure point 201*a* later than equal pressure point 201*b*.

An alternative traveling load detecting mechanism for detecting the load torque will be described with reference to FIGS. 2, 8, 9, 20 and 21. This traveling load detecting mechanism is provided as a simple and inexpensive mechanism for detecting load torque received from front and rear wheels 3 and 6, instead of the above-mentioned torque sensor 198.

Figure 20:
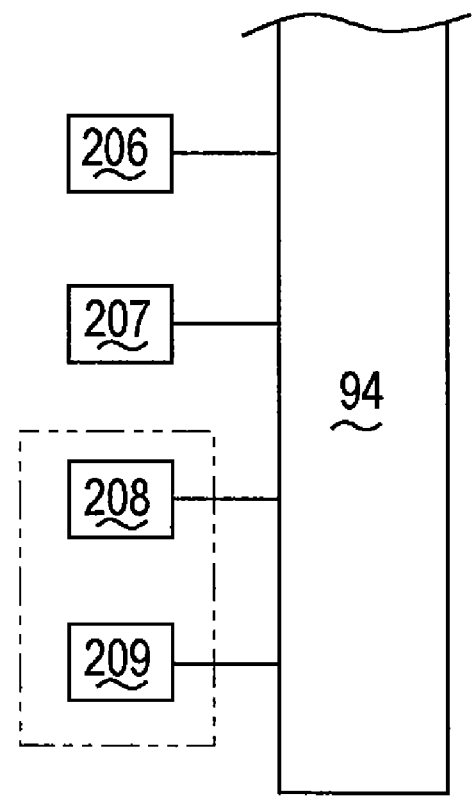
FIG. 20 is a partial block diagram of a traveling load detection unit.

As shown in FIG. 20, an upstream rotation speed sensor 206 and a downstream rotation speed sensor 207 are connected to controller 94 instead of torque sensor 198. Upstream rotation speed sensor 206 is provided for detecting the rotation speed of clutch housing 82*a* of dual clutch unit 82 serving as the upstream side rotary member of clutches C1 and C2. Downstream rotation speed sensor 207 is provide for detecting the rotation speed of output gear 27 serving as the downstream side rotary member of clutches C1 and C2. As shown in FIG. 20, a first hydraulic pressure sensor 208 and a second hydraulic pressure sensor 209 are connected to controller 94 instead of first clutch pressure sensor 199 and second clutch pressure sensor 200. First hydraulic pressure sensor 208 is provided for detecting a hydraulic pressure in a midstream portion of fluid passage 88 connected to cylinder chamber 83 of first clutch cylinder 79, thereby detecting the clutch pressure of first clutch C1, i.e., the pressure of clutch operation fluid supplied to first clutch C1. Second hydraulic pressure sensor 209 is provided for detecting a midstream portion of fluid passage 89 connected to cylinder chamber 84 of second clutch cylinder 80, thereby detecting the clutch pressure of second clutch C2, i.e., the pressure of clutch operation fluid supplied to second clutch C2. In this regard, FIG. 8 shows these hydraulic pressure sensors 208 and 209.

Rotation speed sensors 206 and 207 issue respective detection signals of rotation speeds of clutch housing 82*a* and output gear 27, and controller 94 receives these detection signals from sensors 206 and 207. Hydraulic pressure sensors 208 and 209 transmit respective detection signals of hydraulic pressures supplied to clutches C1 and C2, and controller 94 receives these detection signals from sensors 208 and 209. Controller 94 analyzes the detection signals from sensors 206 and 207 and judges the slippage degree of the friction elements of engaged clutch C1 or C2 and transmits a clutch control signal to corresponding solenoid proportional reduction valve 91 or 92 so as to increase or decrease the clutch pressure of engaged clutch C1 or C2, thereby optimizing the slippage of engaged clutch C1 or C2. In this regard, the target clutch pressure is achieved by monitoring the actual hydraulic pressure detected by sensor 208 or 209.

Figure 21:
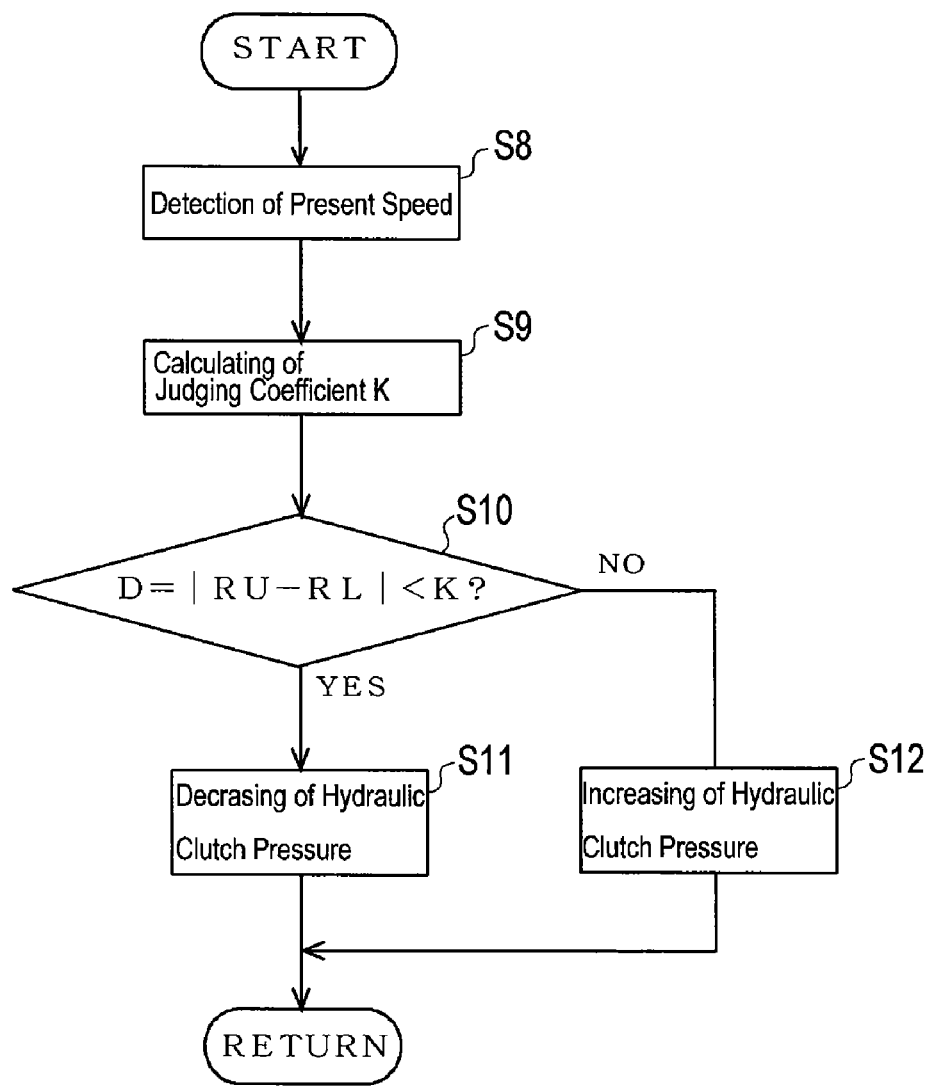
FIG. 21 is a flow diagram showing a procedure of the traveling load detection control.

The flow chart of FIG. 21 will be described. Controller 94 recognizes the present speed stage, i.e., gear ratio of DC transmission 2, based on the position signal from lever position sensor 113, the accelerator position signal from accelerator position sensor 120 and the vehicle speed signal from vehicle speed sensor 121 (Step S8). Controller 94 recognizes an actual upstream rotation speed RU of dual clutch unit 82 based on the rotation speed signal from upstream rotation speed sensor 206, and calculates a downstream rotation speed rL of dual clutch unit 82 when engaged clutch C1 or C2 would be completely engaged, based on the actual upstream rotation speed RU and the present gear ratio of DC transmission 2. A rotation speed difference K (hereinafter, referred to as "judging coefficient") as a judgment criterion for judging either increasing or decreasing of the clutch pressure is calculated on the basis of the difference between actual upstream rotation speed RU and calculated downstream rotation speed rL.

Controller 94 recognizes an actual downstream rotation speed RL of dual clutch unit 82 based on the rotation speed signal from downstream rotation speed sensor 207, calculates an absolute value D of the difference between actual upstream rotation speed RU and actual downstream rotation speed RL (hereinafter, referred to as "absolute value of actual rotation speed difference"), and judges whether or not the absolute value of actual rotation speed difference D is less than judging coefficient K (Step S10). If the absolute value of actual rotation speed difference D is not less than judging coefficient K (Step S10, NO), controller 94 decides that the slippage of engaged clutch C1 or C2 is excessive, and transmits the clutch control signal to corresponding valve 91 or 92 so as to increase the clutch pressure of engaged clutch C1 or C2 (Step S12). On the other hand, if absolute value of actual rotation speed difference D is less than judging coefficient K (Step S10, YES), controller 94 decides that the mutual pressure of the friction elements of engaged clutch C1 or C2 is excessive. Accordingly, controller 94 transmits the clutch control signal to corresponding valve 91 or 92 so as to decrease the clutch pressure of engaged clutch C1 or C2 (Step S11).

By repeating the increase and decrease of clutch pressure, the clutch pressure of engaged clutch C1 or C2 is constantly adjusted so that the friction elements are put in the very boundary state whether they mutually slip or not. The hydraulic clutch pressure controlled in this way corresponds to the load torque received from front and rear wheels 3 and 6 while traveling. The hydraulic clutch pressure supplied to engaged clutch C1 or C2 can be confirmed by monitoring the hydraulic pressure signal from hydraulic pressure sensor 208 or 209.

In this way, the load torque received from front and rear wheels 3 and 6 can be recognized by monitoring the hydraulic clutch pressure to engaged clutch C1 or C2 by use of rotation speed sensors 206 and 207 and hydraulic pressure sensors 208 and 209. Due to this recognition of load torque by monitoring the hydraulic clutch pressure, it is judged whether a gearshift (shift up or shift down) should be performed even if the detected accelerator position and vehicle speed correspond to the gearshift. For example, during uphill traveling of vehicle 210, when DC transmission 2 is automatically shifted up from the first speed to the second speed to simply correspond to the detected accelerator position and vehicle speed, lack of torque may occur and DC transmission 2 may be soon shifted down to the first speed again. The monitoring of the controlled clutch pressure corresponding to load torque can prevent such gearshift waste causing lack of torque. Therefore, even if a high load is applied on wheels 3 or 6 (or engine 9), vehicle 210 can surely travel with suitable gearshift for the high load. Further, the monitoring means are the rotation speed sensors and hydraulic pressure sensors, instead of an expensive and complex torque sensor, thereby reducing costs and improving maintenancability.

The hydraulic clutch pressure may be estimated based on a current value for operating the solenoid proportional reducing valve 91 or 92 instead of hydraulic pressure sensors 208 and 209 because the current value is proportional to the hydraulic clutch pressure. Therefore, no hydraulic pressure sensor exclusively used for monitoring the hydraulic clutch pressure is needed, thereby reducing the number of components and costs, and minimizing DC transmission 2.

Figure 15:
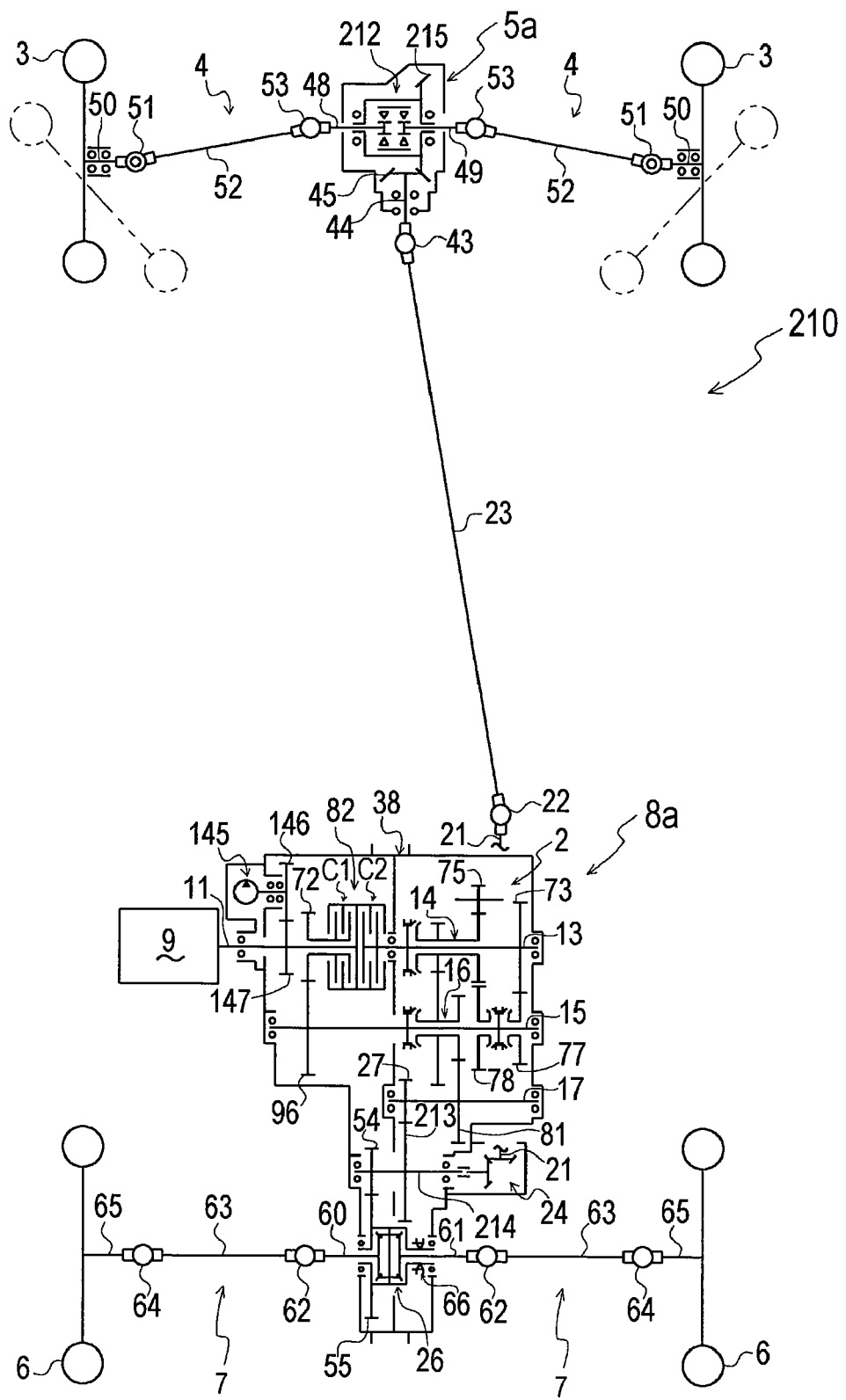
FIG. 15 is a plain view of an entire construction of a working vehicle 210 according to another embodiment.

Other embodiments of working vehicle 1 will be described with reference to FIGS. 15 to 17. Referring to FIG. 15, in a working vehicle 210 serving as another embodiment of working vehicle 1, a rear transaxle 8a does not include a device corresponding to central differential gear assembly 28 of rear transaxle 8 of working vehicle 1, and a front transaxle 5a including a bi-directional clutched differential assembly 212 is provided to replace front transaxle 5 including front differential gear assembly 25. Bi-directional clutched differential assembly 212 may be any type assembly, such as a roller-type or a friction disc-type, only if it can function as a switch between a four-wheel drive mode and a two-wheel drive mode in the later-described way.

In rear transaxle 8a of working vehicle 210, output gear 27 fixed on transmission output shaft 17 directly meshes with a gear 213 fixed on a distribution shaft 214. Gear 54 fixed on distribution shaft 214 meshes with ring gear 55 of rear differential gear assembly 26 so as to output power to rear wheels 6. On the other hand, front-wheel driving PTO section 24 is provided on a side surface of the casing of rear transaxle 8a laterally opposite to engine 9. In this embodiment, engine 9 is disposed on the left side of rear transaxle 8a, and front-wheel driving PTO section 24 is disposed on the right side of the casing of rear transaxle 8a. Distribution shaft 214 is extended laterally (rightward) outward from the casing of rear transaxle 8a into front-wheel driving PTO section 24 so as to be drivingly connected to PTO shaft 21 for outputting power to front transaxle 5a.

In front transaxle 5a of working vehicle 210, bevel gear 45 is formed (fixed) on the front end of input shaft 44 which is connected to PTO shaft 21 via propeller shaft 23 with universal joints 43 and 22. A ring gear (input gear) 215 of bi-directional clutched differential assembly 212 meshes with bevel gear 45. During normal traveling of vehicle 210, the clutch of bi-directional clutched differential assembly 212 is disengaged so that working vehicle 210 travels only by drive power of rear wheel 6, i.e., in the two wheel drive mode, so as not to transmit the rotation of ring gear 215 to left and right front axles 50. When any of front or rear wheels 3 or 6 is skidded and the rotational speed of front wheels 3 is decreased and becomes slower than that of ring gear 215, the clutch of bi-directional clutched differential assembly 212 is engaged so as to transmit the power of ring gear 215 to front wheels 3, thereby driving the working vehicle 210 in the four wheel drive mode. Further, the bi-directional clutched differential assembly 212 can be switched between the two-wheel drive state and the four-wheel drive state regardless of whether vehicle 210 travels forward or backward.

Therefore, in working vehicle 210, rear transaxle 8a without a device corresponding to central differential gear assembly 28 is minimized. Due to front transaxle 5a including bi-directional clutched differential assembly 212, working vehicle 210 usually travels in the two-wheel drive mode only by driving rear wheels 6 with rear transaxle 8. When the load torque is increased or any front or rear wheel 3 or 6 is skidded, the clutch of bi-directional clutched differential assembly 212 is engaged so that working vehicle 210 travels in the four wheel drive mode. Working vehicle 210 with bi-directional clutched differential assembly 212 can economically travel with reduction of fuel consumption in comparison with a vehicle which always travels in the four-wheel drive mode.

Figure 16:
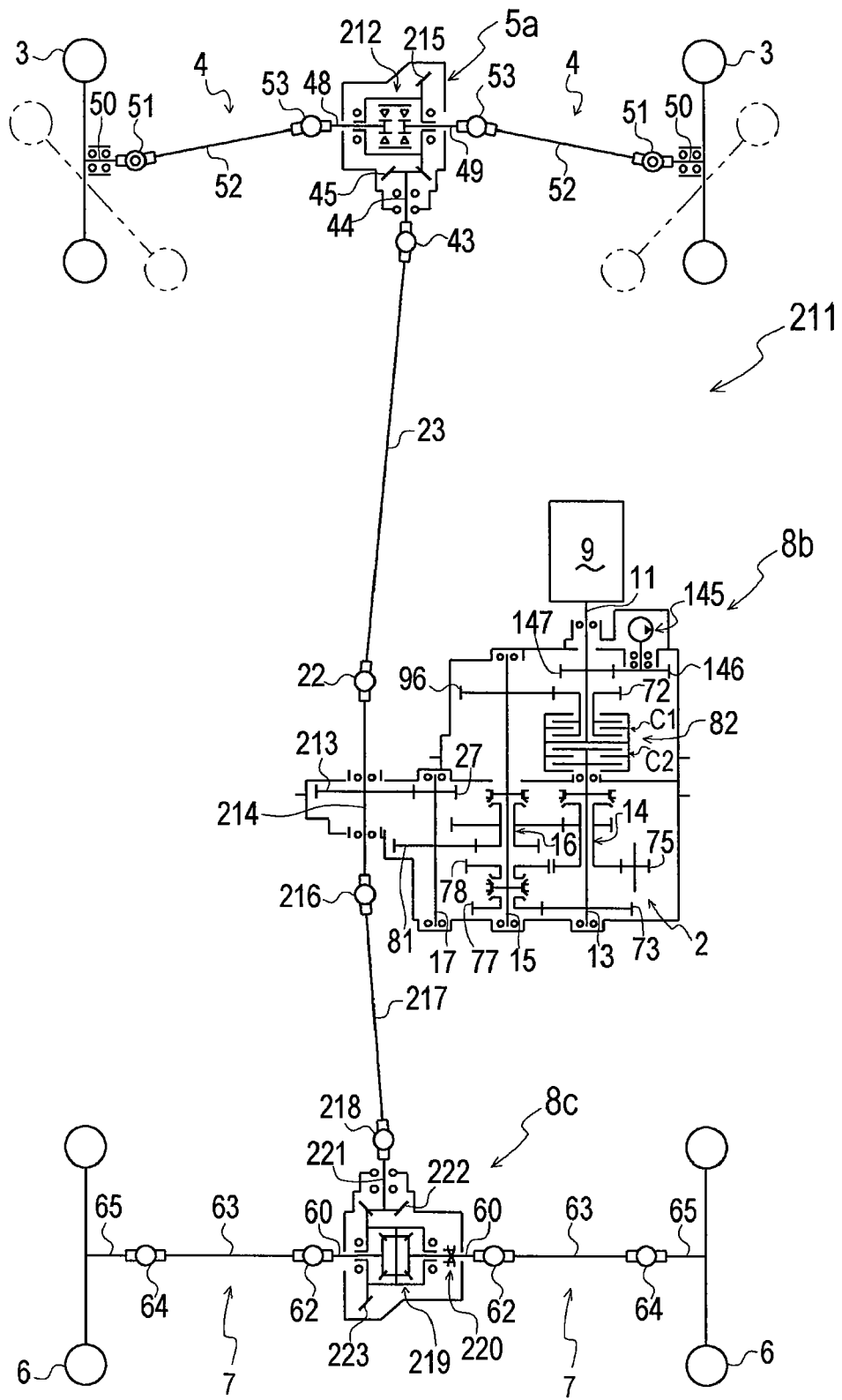
FIG. 16 is a plain view of an entire construction of a working vehicle 211 according to another embodiment.

A working vehicle 211 as shown in FIG. 16, serving as another embodiment of working vehicle 1 or 210, is provided with front transaxle 5a identical to that of working vehicle 210, and is provided with a central transmission 8b and a rear transaxle 8c whose combination corresponds to rear transaxle 8a of working vehicle 210. Central transmission 8b is disposed at a fore-and-aft middle portion of vehicle 211, and rear transaxle 8c is disposed at a rear portion of vehicle 211 behind central transmission 8b.

Central transmission 8b is disposed behind engine 9 and incorporates DC transmission 2 so that DC transmission 2 is oriented so as to fore-and-aft extend its shafts 11, 13 and 15, perpendicular to those of DC transmission 2 extended laterally in rear transaxle 8a connected to engine 9 on one lateral side of rear transaxle 8a. Further, distribution shaft 214 is oriented not laterally but fore-and-aft and is connected at a front end thereof to propeller shaft 23 via universal joint 22. Propeller shaft 23 is connected to bi-directional clutched differential assembly 212 in front transaxle 5a. In this way, the rotary force of fore-and-aft extended distribution shaft 214 of central transmission 8b is outputted forward to ring gear 215 of bi-directional differential assembly 212 through universal joint 22, propeller shaft 23, universal joint 43, input shaft 44 and bevel gear 45. As mentioned above, bi-directional clutch differential assembly 212 normally allows front wheels 3 to rotate freely from the rotary force of ring gear 215, and differentially drives left and right front wheels 3 as needed.

On the other hand, distribution shaft 214 is connected at the rear end thereof to a front end of a propeller shaft 217 via a universal joint 216. Rear transaxle 8c incorporates a rear differential gear assembly 219 that is substantially the same as rear differential gear assembly 26 in rear transaxle 8a. Propeller shaft 217 is extended rearward and is connected at a rear end thereof, via a universal joint 218 to an input shaft 221 of rear transaxle 8c. In rear transaxle 8c, a bevel gear 222 is fixed on a rear end of input shaft 221, and a ring gear 223 of rear differential gear assembly 219 meshes with bevel gear 222 so that rear differential gear assembly 219 differentially drives left and right rear wheels 6. Further, in rear transaxle 8c, rear differential gear assembly 219 is provided with a differential lock mechanism 220 for differentially locking left and right axles 7.

Further, central transmission 8b supports distribution shaft 214 at a left portion thereof, and is entirely arranged at a rightward portion of working vehicle 211, so that distribution shaft 214 and propeller shafts 23 and 217 connected to one another via universal joints 43, 22, 216 and 218 are disposed at a substantially lateral middle portion of working vehicle 211, and are substantially linearly aligned between front and rear transaxles 5a and 8c. Due to the location of central transmission 8b for substantially linearly arranging shafts 214, 23 and 217, the angle between the shafts at each of universal joints 43, 22, 216 and 218 is reduced so as to enhance the power transmission efficiency.

Figure 17:
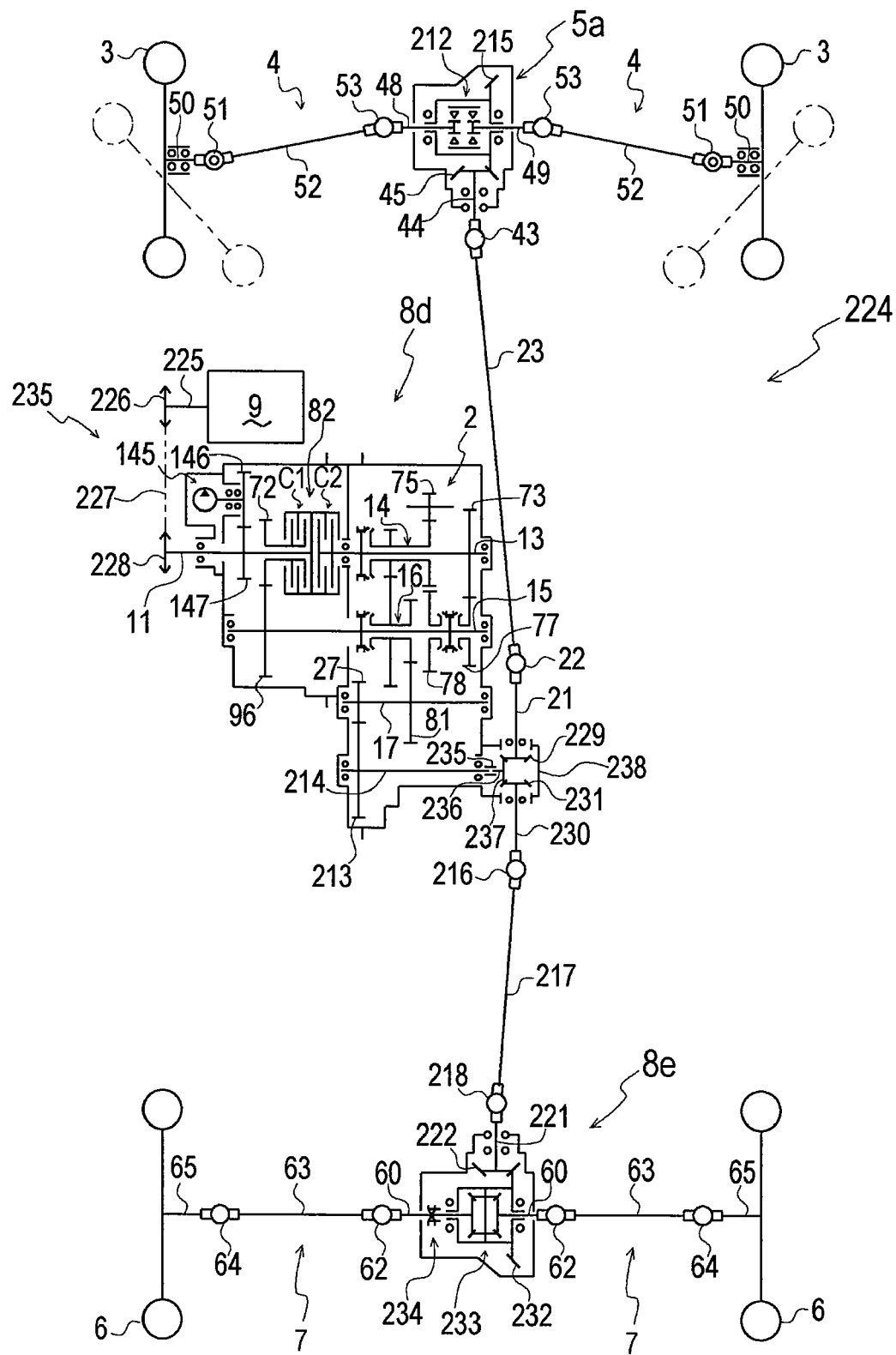
FIG. 17 is a plain view of an entire construction of a working vehicle 224 according to another embodiment.

A working vehicle 224 shown in FIG. 17 serving as another embodiment of working vehicle 1, 210 or 211 is provided with front transaxle 5a, a central transmission 8d and a rear transaxle 8e. In working vehicle 224, central transmission 8d incorporates DC transmission 2 which is arranged so as to orient its shafts 11, 13 and 15 laterally. Engine 9 is disposed in front of central transmission 8d and has a lateral engine output shaft 225 parallel to input shaft 11 of DC transmission 2. A chain transmission 235 is interposed between engine output shaft 225 of engine 9 and input shaft 11 of DC transmission 2. Chain transmission 235 includes sprockets 226 and 228 fixed on respective outer (left) ends of engine output shaft 225 and input shaft 11, and includes a chain 227 interposed between sprocket 226 and 228. Engine 9 is not laterally offset from central transmission 8d but is disposed in front of central transmission 8d, thereby reducing the lateral width of vehicle 224 required for arranging engine 9.

A PTO housing 238 for outputting power to front transaxle 5a is mounted on a side surface of a casing of central transmission 8d laterally opposite to chain transmission 235. In this embodiment, chain transmission 235 is disposed on the left side of central transmission 8d, and PTO housing 238 is convexly mounted on the right side surface of the housing of central transmission 8d. Lateral distribution shaft 214 of DC transmission 2 is extended rightward into PTO housing 238 and is rotatably integrally connected at a right end thereof to a coaxial gear shaft 236 via a coupling 235.

In PTO housing 238, a bevel gear 237 is fixed on gear shaft 236. Front PTO shaft 21 for outputting power to front transaxle 5a is supported by PTO housing 238 and projects forwardly outward from PTO housing 238. In PTO housing 238, a bevel gear 229 is fixed on a rear end of front PTO shaft 21 and meshes with bevel gear 237. A rear PTO shaft 230 for outputting power to rear transaxle 8e is supported by PTO housing 238 and projects rearwardly outward from PTO housing 238. In PTO housing 238, a bevel gear 231 is fixed on a front end of rear PTO shaft 230 and meshes with bevel gear 237. In this way, the rotary force of distribution shaft 214 as the output power of DC transmission 2 is distributed between front and rear transaxles 5a and 8e.

Propeller shaft 23 and universal joints 22 and 43 are interposed between front PTO shaft 21 and input shaft 44 of front transaxle 5a, similar to those interposed between distribution shaft 214 and input shaft 44 in working vehicle 211. As mentioned above, bi-directional clutch differential assembly 212 normally allows front wheels 3 to rotate freely from the rotary force of ring gear 215 receiving the rotary force of input shaft 44, and transmits the rotary force of ring gear 215 to left and right yoke shafts 48 and 49 at need so as to differentially drive left and right front wheels 3.

Propeller shaft 217 and universal joints 216 and 218 are interposed between rear PTO shaft 230 and input shaft 221 of rear transaxle 8e. Rear transaxle 8e incorporates a rear differential gear assembly 233 with a differential lock mechanism 8e so as to drive left and right rear wheels 6. In rear transaxle 8e, a ring gear 232 serving as an input gear of rear differential gear assembly 233 meshes with a bevel gear 222 fixed on input shaft 221 so as to input power to rear differential gear assembly 233.

Rear differential gear assembly 233 is identical to rear differential gear assembly 219 of working vehicle 211 when being laterally inversed. In this regard, while rear transaxle 8c of working vehicle 211 has input shaft 221 leftwardly forward from differential gear assembly 219, rear transaxle 8e of working vehicle 224 has input shaft 221 rightwardly forward from differential gear assembly 233. With regard to working vehicle 211, due to the leftward arrangement of input shaft 221 in rear transaxle 8c, propeller shaft 217 connected to input shaft 221 via universal joint 218 can be substantially linearly connected via universal joint 216 to distribution shaft 214 disposed at the leftward portion of central transmission 8b as mentioned above, thereby reducing power loss. On the other hand, with regard to working vehicle 224, due to the rightward arrangement of input shaft 221 in rear transaxle 8e, propeller shaft 217 connected to input shaft 221 via universal joint 218 can be substantially linearly connected via universal joint 216 to rear PTO shaft 230 disposed at the rightward portion of central transmission 8d, thereby reducing power loss. In this way, the substantially linear alignment of shafts with universal joints can be achieved by arranging input shaft 221 at either the left or right portion of the rear transaxle (8c or 8e) considering whether the output shaft or shafts (i.e., distribution shaft 214 or PTO shafts 21 and 213) of DC transmission 2 for distributing power between the front and rear transaxles is disposed leftward or rightward of the central transmission (8b or 8d) incorporating DC transmission 2.

The above-mentioned various embodiments can be adapted to any vehicle equipped with a dual clutch transmission comprising first and second clutches, a group of odd-numbered speed drive trains, and a group of even-numbered speed drive trains. The first and second clutches are alternately engaged/disengaged so that, during the shift of engagement between the first and second clutches, an engagement action of one of the first and second clutches overlaps a disengagement action of the other of the first and second clutches. When one of the odd-numbered speed drive trains is selected to be activated, the odd-numbered speed drive train selected to be activated is activated by engaging the first clutch. When one of the even-numbered speed drive trains is selected to be activated, the even-numbered speed drive train selected to be activated is activated by engaging the second clutch.

The invention claimed is:

1. A dual clutch transmission comprising:
   first and second clutches alternately engaged/disengaged so that, during a shift of engagement between the first and second clutches, an engagement action of one of the first and second clutches overlaps a disengagement action of the other of the first and second clutches;
   a group of forward-traveling odd-numbered speed drive trains, wherein, when one of the forward-traveling odd-numbered speed drive trains is selected to be activated, the selected forward-traveling odd-numbered speed drive train is activated by engaging the first clutch;
   a group of forward-traveling even-numbered speed drive trains, wherein, when one of the forward-traveling even-numbered speed drive trains is selected to be activated, the selected forward-traveling even-numbered speed drive train is activated by engaging the second clutch;

a backward-traveling drive train, wherein, when the backward-traveling drive train is selected to be activated, the selected backward-traveling drive train is activated by engaging one of the first and second clutches;

a traveling direction setting means for establishing either a forward-traveling state or a backward-traveling state; and a traveling mode setting means for establishing either a normal traveling mode or a reverse mode, wherein, when the backward-traveling state is established by the traveling direction setting means regardless of whether the normal traveling mode or the reverse mode is established by the traveling mode setting means, the backward-traveling drive train is selected to be activated and is activated by engaging the one of the first and second clutches;

wherein, when the normal traveling mode is established by the mode setting means and the forward-traveling state is established by the traveling direction setting means, any one drive train of all the forward-traveling odd-numbered and even-numbered speed drive trains is selected to be activated so as to correspond to variation of an accelerator position and an actual traveling speed of a vehicle, and is activated by engaging the first or second clutch for activating the drive train selected to be activated, and wherein, when the reverse mode is established by the traveling mode setting means and the forward-traveling state is established by the traveling direction setting means, a predetermined forward-traveling drive train of all the forward-traveling odd-numbered and even-numbered speed drive trains is selected to be activated regardless of variation of the accelerator position and the actual traveling speed of the vehicle, and is activated by engaging the first or second clutch that is different from the clutch for activating the backward-traveling drive train.

2. The dual clutch transmission according to claim 1, wherein, while the reverse mode is established by the traveling mode setting means, both the predetermined forward-traveling drive train and the backward-traveling drive train are constantly selected to be activated regardless of whether the forward-traveling state or the backward-traveling state is established by the traveling direction setting means.

3. The dual clutch transmission according to claim 1, wherein the predetermined forward-traveling drive train is the lowest speed drive train of either the forward-traveling odd-numbered speed drive train group or the forward-traveling even-numbered speed drive train group, to which the predetermined forward-traveling drive train belongs.

4. The dual clutch transmission according to claim 3, wherein the clutch to be engaged for activating the backward-traveling drive train is the second clutch, and the predetermined forward-traveling drive train is a forward-traveling first speed drive train to be activated by engaging the first clutch.

5. The dual clutch transmission according to claim 3, wherein the clutch to be engaged for activating the backward-traveling drive train is the first clutch, and the predetermined forward-traveling drive train is a forward-traveling second speed drive train to be activated by engaging the second clutch.

6. The dual clutch transmission according to claim 1, further comprising:

a single manipulator serving as both the traveling direction setting means and the traveling mode setting means;

a first guide region provided with a forward-traveling setting position and a backward-traveling setting position; and a second guide region provided with a forward-traveling setting position and a backward-traveling setting position, wherein the normal traveling mode is established when the manipulator is disposed in the first guide region, wherein the reverse mode is established when the manipulator is disposed in the second guide region, wherein the forward-traveling state is established by locating the manipulator at the forward-traveling setting position of each of the first and second guide regions, and wherein the backward-traveling state is established by locating the manipulator at the backward-traveling setting position of each of the first and second guide regions.

* * * * *

UNITED STATES PATENT AND TRADEMARK OFFICE
CERTIFICATE OF CORRECTION

| | |
|---|---|
| PATENT NO. | : 8,105,203 B2 |
| APPLICATION NO. | : 12/191032 |
| DATED | : January 31, 2012 |
| INVENTOR(S) | : Norihiro Ishii et al. |

It is certified that error appears in the above-identified patent and that said Letters Patent is hereby corrected as shown below:

In item (73), the Assignee name reading "Kanzaki Kokyakoki Mfg. Co., Ltd." should read --Kanzaki Kokyukoki Mfg. Co., Ltd.--.

Signed and Sealed this
Fifth Day of June, 2012

David J. Kappos
*Director of the United States Patent and Trademark Office*